(12) United States Patent
Peitzke et al.

(10) Patent No.: US 7,493,885 B2
(45) Date of Patent: *Feb. 24, 2009

(54) ASYMMETRIC COMPLETE EXPANSION ROTARY ENGINE CYCLE

(75) Inventors: William R. Peitzke, Santa Barbara, CA (US); James G. P. Dehlsen, Goleta, CA (US); Geoffrey F. Deane, Goleta, CA (US)

(73) Assignee: Gyroton Corporation, Carpinteria, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/189,137

(22) Filed: Jul. 25, 2005

(65) Prior Publication Data

US 2005/0284439 A1    Dec. 29, 2005

Related U.S. Application Data

(63) Continuation of application No. 09/570,323, filed on May 12, 2000, now Pat. No. 6,955,153.

(51) Int. Cl.
*F02B 53/00* (2006.01)
(52) U.S. Cl. .................. 123/241; 123/244; 123/246
(58) Field of Classification Search ............ 123/221, 123/222, 225, 226, 228, 237, 241, 244, 246
See application file for complete search history.

(56) References Cited

U.S. PATENT DOCUMENTS

| | | | | | |
|---|---|---|---|---|---|
| 1,193,808 | A | * | 8/1916 | McCarthy | 123/232 |
| 3,791,352 | A | * | 2/1974 | Takacs | 123/239 |
| 3,931,807 | A | * | 1/1976 | Bloom | 123/228 |
| 3,990,409 | A | * | 11/1976 | Beverly | 123/246 |
| 4,086,880 | A | * | 5/1978 | Bates | 123/232 |
| 4,741,308 | A | * | 5/1988 | Ballinger | 123/231 |
| 6,244,240 | B1 | * | 6/2001 | Mallen | 123/243 |
| 6,955,153 | B1 | * | 10/2005 | Peitzke et al. | 123/241 |

* cited by examiner

*Primary Examiner*—Hoang M Nguyen
(74) *Attorney, Agent, or Firm*—Felix L. Fischer

(57) ABSTRACT

An asymmetric complete-expansion thermodynamic engine cycle is provided by an engine which compresses an air/fuel mixture to a given ratio, ignites and combusts the mixture, and expands the products through a power stroke to a volume substantially larger than the compression volume before being vented and purged to the atmosphere. This cycle is performed by a non-axisymmetric main rotor revolving within a cylindrical housing. Sealing means associated with the main rotor provide for the varied compression and expansion volumes. The cylindrical housing also contains means for air intake, fuel injection, venting, and spent gas exhaust porting.

6 Claims, 33 Drawing Sheets

(p)

(m)

ASYMMETRIC COMPLETE EXPANSION ROTARY ENGINE CYCLE

REFERENCE TO RELATED APPLICATIONS

This application is a continuation of application Ser. No. 09/570,323 having a filing date of May 12, 2000 now U.S. Pat. No. 6,955,153 entitled Asymmetric Complete Expansion Rotary Engine Cycle and having a common assignee as the present application.

BACKGROUND OF THE INVENTION

1. Field of the Invention

This invention relates to internal combustion engines and compressor/expanders, and more particularly to rotary internal combustion engines having thermodynamic cycles differing from the traditional Otto Cycle.

2. Description of the Prior Art

The general functioning of internal combustion rotor rotary engines has typically followed the Otto Cycle, whose thermodynamic pressure-volume relationship is shown in FIG. 1. Typically, as a main rotor lobe passes over an intake port, air is entrained behind it, as shown by the substantially horizontal line at 2. Fuel is injected into the air, and the mixture is compressed 4 into a compression rotor by the front of the lobe. As the main rotor lobe passes over the compression rotor, the mass of air/fuel mixture is transferred from in front of to behind the lobe, and is trapped between the lobe and compression rotor. A spark ignites the mixture at 6, yielding a working pressure on the back of the lobe. As the lobe rotates, the spent gas expands 8, doing work, before being vented to the atmosphere 10. The lobe passes over the intake rotor, leaving the spent gas behind and beginning a new cycle of intake and compression. The spent gas is expelled 12 from the engine by the front of the next main rotor lobe.

The ideal Otto Cycle thermodynamic efficiency (11') is given by:

$$\eta_t = 1 - \frac{1}{r_v^{k-1}} \quad (1)$$

Where $r_v$ is the cycle's volumetric compression ratio, and where the isentropic value of k for air/fuel mixtures is assumed to be 1.35. For example, the ideal thermal efficiency of an idealized Otto Cycle with a compression ratio of 7.4:1 can be found to be 50.4%. The work performed by the cycle can be calculated by integrating the area bounded by the cycle's curves 14. Eq. (1) assumes that the compression and expansion ratios are equivalent. However, asymmetries characteristic of certain rotary engines allow these volumes to differ. In general, when the expansion ratio exceeds the compression ratio the bounded work area is larger as shown in FIG. 2, and the cycle's thermodynamic efficiency is increased—and vice versa. In theory, the maximum work extractable from an engine results from expanding the spent gasses until their pressure is reduced to atmospheric before expelling them 20 (extending the area bounded by the cycle 22). Therefore, asymmetries allowing greater expansion than compression are desirable, and "reverse asymmetries," which expand less than they compress, are undesirable.

It is also highly desirable for an engine to operate in uniform circular motion because of the mechanical simplicity it affords. A review of the prior art has yielded no engine designs which combine asymmetric compression and expansion and uniform circular motion ill the manner of the present invention. Search of the prior art uncovered designs that would at first appear somewhat similar but which failed to meet the criteria reference hereunder.

When combustion does not occur at the point of maximum compression, the engine must be built, and energy sacrificed, to provide the higher compression pressures and temperatures, but it is then unable to benefit from such pressure ratios. FIG. 3 shows the idealized Otto Cycle compression 30, combustion 32 and expansion 34 strokes for a cycle which overcompresses prior to combustion relative to a cycle where the combustion timing is optimum 38. The engine compresses the gas to a maximum pressure and then reduces the pressure before combusting, resulting in lower peak combustion pressures and temperatures. As can be seen, a significant amount of work 36 is lost.

If spent gas (combustion product) is carried over into the oncoming and compressing charge of fresh air, the thermodynamic efficiency of combustion may be hampered. This is a common characteristic of compression rotors that spin with greater angular velocity than their main rotors. Further, when such compression rotors close-off too soon, prematurely entrapping their pressurized working gases, the gas is stopped from expanding, reducing the work which that volume applies to the engine. If this pressurized gas is introduced into the oncoming charge, its effects on combustion are highly deleterious. To avoid this, some designs have made an allowance for the venting the excess pressure of trapped combustion volumes; but none for removing it's volume before it impairs the following cycle. In these cases, the combustion products become a fraction of the total new gas under compression equal to the volume of the compression chamber divided by the compression chamber volume plus the volume of the fresh air charge. FIG. 4 depicts the pressure-volume relation for such a cycle, where one compression chamber volume is removed from the cycle after half an expansion, the pressure is reduced to atmospheric, and the remaining gas is mixed with the incoming fuel/air charge. In this case, a 7% reduction in work is observed 40.

U.S. Pat. No. 3,498,271 describes a rotary engine with a three-lobed main rotor, partially geared to mesh with a compression chamber and a clearance rotor. Because the compression and clearance rotors are only partially geared, the rotational velocity of these parts is not uniform, accelerating and decelerating as the main rotor lobes interact with them. In addition, the rotational velocity of the two peripheral rotors is three times as great as that of the main rotor. This causes the compression rotor to close off prematurely, entrapping a significant portion of the highly pressurized spent gasses and preventing them from expanding and doing work. The compression rotor also transfers a portion of these gasses back to mix with the incoming charge of fuel/air mixture, reducing the thermal efficiency of combustion. The combustion takes place significantly past the point of maximum compression, further reducing the thermal efficiency resulting from compression. The compression rotor serves as the back wall for the combustion.

The expansion and compression ratios for this engine would be identical if not for this premature sequestration of spent gas.

U.S. Pat. No. 3,990,409 depicts a four-lobed main rotor with uniform rotational velocity one half that of the two peripheral rotors. The rotor is designed to create a high-pressure area upstream of the combustion rotor which will minimize leakage across the seal between the main rotor and the compression rotor. However, in doing this, the engine's compression ratio is greatly reduced, and each compression must work against this higher initial back-pressure, decreasing the net work done by the engine. A non-working volume is incorporated as post-combustion porting to expand a portion of the pressurized gas trapped by the premature closure of the compression chamber; the compression rotor then recycles a one atmosphere rotor volume of spent gasses back into the oncoming charge of fresh and spent gases. The placement of the ignition point on the surface of the main rotor lobes minimizes the rotor travel required before combustion, but still necessitates combustion beyond the point of maximum compression thereby precluding spark advance. The, resulting, shape of the combustion chamber is inefficient having a high ratio of surface area to volume. The compression rotor pressure is vented to the exhaust by means of a separate passage but not purged by fresh incoming air, as such significant non-working gases are reprocessed each cycle.

U.S. Pat. No. 1,136,344 shows a rotary engine with four main rotor lobes and two peripheral rotors geared to have angular velocities four times as great as the main rotor. As in the previous patent, this causes the compression rotor to close off prematurely, trapping a portion of the pressurized combustion products before they are allowed to fully expand. This spent gas is carried back into the oncoming fresh charge of fuel/air mixture, reducing thermodynamic efficiency. Combustion is not initiated until well beyond the point of maximum compression, reducing thermodynamic efficiency, creating negative asymmetry, and requiring the flame front to move too rapidly.

U.S. Pat. No. 2,927,560 illustrates another four-lobed main rotor design with two peripheral rotors partially geared to have twice the angular velocity of the main rotor. This design suffers from very low compression ratios and geometries that allow mixing between compressing and expanding volumes. The design also utilizes complex ducting to move gas volumes, significantly reducing the volumetric efficiency of the engine.

U.S. Pat. No. 892,201 depicts a single-lobe main rotor that passes over lobe valves. The compression lobe valve acts to transfer the compressed gas from the front of the rotor lobe to the back, while the clearance valve acts to separate the spent gas being expelled from the clean intake air. The engine operates with non-uniform motion and very poor internal volumetric efficiency, although it does produce a beneficial compression/expansion asymmetry. Combustion occurs past the point of maximum compression, with the compression lobe valve chamber acting as a partial combustion chamber.

U.S. Pat. Nos. 1,003,263 and 5,595,154 illustrate similar engines with three rotors in uniform circular motion and with peripheral rotors spinning at the same rotational velocity and in the same direction as the main rotor. In both designs, the main rotor compresses gas into an area that acts as a part of the combustion chamber, although combustion does not occur until the main rotor is well past the point of maximum compression. The location of the ignition point, in addition to creating a flame front that must travel in two directions, creates a strong reverse asymmetry. The clearance rotor allows a significant amount of spent gas to be transferred to the intake charge of air, reducing the efficiency of the combustion. Lastly, the oblong geometry of the compression and clearance rotors makes adequate sealing difficult for both designs.

U.S. Pat. No. 1,226,745 shows a rotary engine with a two-lobed main rotor and two peripheral rotors spinning with tile same angular velocities. Although the engine does benefit from asymmetry, combustion is not initiated until well past the point of maximum compression, eliminating much of this benefit. The compression rotor is used as only a part of the combustion chamber, and it carries a volume of pressurized combustion products back into the incoming charge of fresh mixture, reducing the thermodynamic efficiency.

U.S. Pat. No. 1,272,728 depicts a rotary engine with a three-lobed main rotor and non-rotating compression and clearance lobe valves connected to the main rotor via cams. Although a portion of the compression valve chamber is used as a combustion chamber, the combustion is not initiated until after the point of maximum compression. Additionally, the complex combination of valves and cams make ignition timing very difficult for this design.

U.S. Pat. No. 3,297,006 provides for a two lobed rotor and a single compression rotor, rotating at the same angular velocity and pressurized gas fed into the combustion rotor. The compressed mixture is released, via an auxiliary channel where it is combusted, to behind the main rotor lobe. This design includes a significant non-working expansion volume and precludes asymmetry.

U.S. Pat. No. 4,086,880 is a compressor/expander with one main rotor lobe and one compression rotor.

SUMMARY OF THE INVENTION

Although the use of rotational motion with multiple rotors in a combustion engine is known in the art, no inventions have been identified which follow the asymmetric complete-expansion thermodynamic cycle of the present invention referenced herein.

Our preferred engine embodiment follows this cycle and avoids the shortcomings of other designs by combusting at or appropriately before the point of maximum compression, by carrying little or no exhaust into the incoming charge of fresh air, by purging and venting the compression rotor prior to each combustion, and by performing with a very high volumetric efficiency.

The present invention pertains to a thermodynamic combustion cycle in which an engine compresses an air/fuel mixture to a given ratio, ignites and combusts the mixture, and expands the products through a power stroke to a volume substantially larger than the compression volume before being vented and purged to the atmosphere. The compression-expansion volume asymmetry, which is not possible in reciprocating engines following the Otto Cycle, allows for greater thermodynamic efficiency of the engine. There are several mechanisms described herein capable of following this cycle.

In the preferred embodiment of an engine capable of achieving the Peitzke Cycle, this cycle is performed by a non-axisymmetric main rotor revolving within a cylindrical housing. Additional rotors, geared to and spinning with the same angular velocity as the main rotor, are located around the periphery of the cylindrical housing. The cylindrical housing also contains means for air intake, fuel injection, compression rotor venting, and spent gas exhaust porting, as well as provision for insulated ignition guide(s) and various sensors. While the functions and placement of these components will be described later, the unique and innovative combination and geometries of these components serve to produce and follow an idealized, Asymmetric Complete-Expansion Cycle, in contrast to the conventional Otto Cycle followed by other designs in our study of the prior art.

The present cycle intakes, vents, and compresses a volume of gas, combusting it at the ideal point of advancement to maximum compression. The combusted gas is then expanded to a volume substantially larger than the compressed portion of the intake volume, the pressure utilized to propel the main rotor until pressure is reduced to atmospheric, and the gas is expelled. The design employs minimal non-working volumes, and carries nominal spent gases into the next cycle intake air, while employing minimal internal restrictions, resulting in very high volumetric efficiency. The rotational design and nature of the engine allows the combustion pressure to develop tangential to the direction of rotation and maintain such tangential pressure for the intended duration of the asymmetric cycle. The tangential force begins within a minimal degree of post-combustion rotor travel, creating higher mechanical efficiencies than found in present reciprocating engine designs.

The asymmetric complete expansion cycle engine achieves a high efficiency rotary engine with an asymmetry allowing for an ideally greater volume expansion than compression, by nature the thermodynamic efficiency of this design is calculated by a different formula, that being:

$$\eta_t = 1 - \frac{1}{r_v^{k-1}} * \frac{k(r-1)}{r^k - 1} \quad (2)$$

With r being the isentropic ratio between the air volume compressed and the final volume of the full asymmetric expansion (volume compressed/volume expanded) it can be seen that the second segment of equation 2 serves to produce a multiple (i.e. 1.08) which improves the $\eta_t$ of the work cycle by such amount relative to a standard symmetric Otto Cycle. Hence equation 2 may be used to calculate the theoretical $\eta_t$ for the improved Complete-Expansion Cycle which the present invention utilizes. The difference in efficiencies in the use of fuel between the present rotary engine following the Complete-Expansion Cycle and other engines operating in symmetric, and often negative asymmetric, operation becomes significantly more pronounced when the incumbent mechanical and volumetric efficiencies are factored into the overall systems.

DESCRIPTION OF THE PREFERRED EMBODIMENT

Several mechanism designs have been developed to follow the Asymmetric Complete Expansion Cycle of the present invention, hereafter referred to as the "Peitzke" Cycle. They are described below as methods of achieving the Peitzke Cycle.

In order to maximize engine performance, several key engine characteristics were identified. First, pre-compression intake air must have minimal exhaust gas mixed with it. Second, rotors operating in uniform circular motion reduce component loading, reduce energy losses from reciprocating components, provide smoothness of operation and high reliability, as well as enable adequate seal and separation between air volumes. Third, the compression chamber must also contain minimal exhaust gas prior to accepting compressed gas, and to initiating combustion. Fourth, combustion must be initiated appropriately before the point of maximum compression (timing advance) to fully benefit from this compression and allow for the development of an appropriate flame front. Fifth, the combustion must develop while the volume is held nearly constant, or at the point of minimum volumetric expansion rate. Sixth, the entire volume of combustion products must be expanded to the engine's full expansion ratio. Seventh, because the expansion behind the main rotor lobe and the exhausting of spent gas ahead of the lobe are achieved concurrently, the spent gas must be at atmospheric pressure prior to the exhaust stroke to minimize parasitic pumping losses. By eliminating non-compression of spent combustion products and the carry-over of these products into the fresh air/fuel mixture, an extremely high volumetric efficiency can be achieved. In addition, in contrast to the standard Otto Cycle which has symmetric compression and expansion, large increases in efficiency can be achieved by making the expansion ratio significantly larger than the compression ratio, thus following the referenced Peitzke Cycle. By combining these elements into a single design criteria, the present invention becomes the first rotary engine which attains the desired Peitzke Cycle while functioning in true uniform circular motion. The unique intentional simultaneous embodiment of these key criteria into one design provides a significant advancement to the art of engine design by allowing operation in true uniform circular motion of a Rotary Complete-Expansion Cycle.

Figure 1:
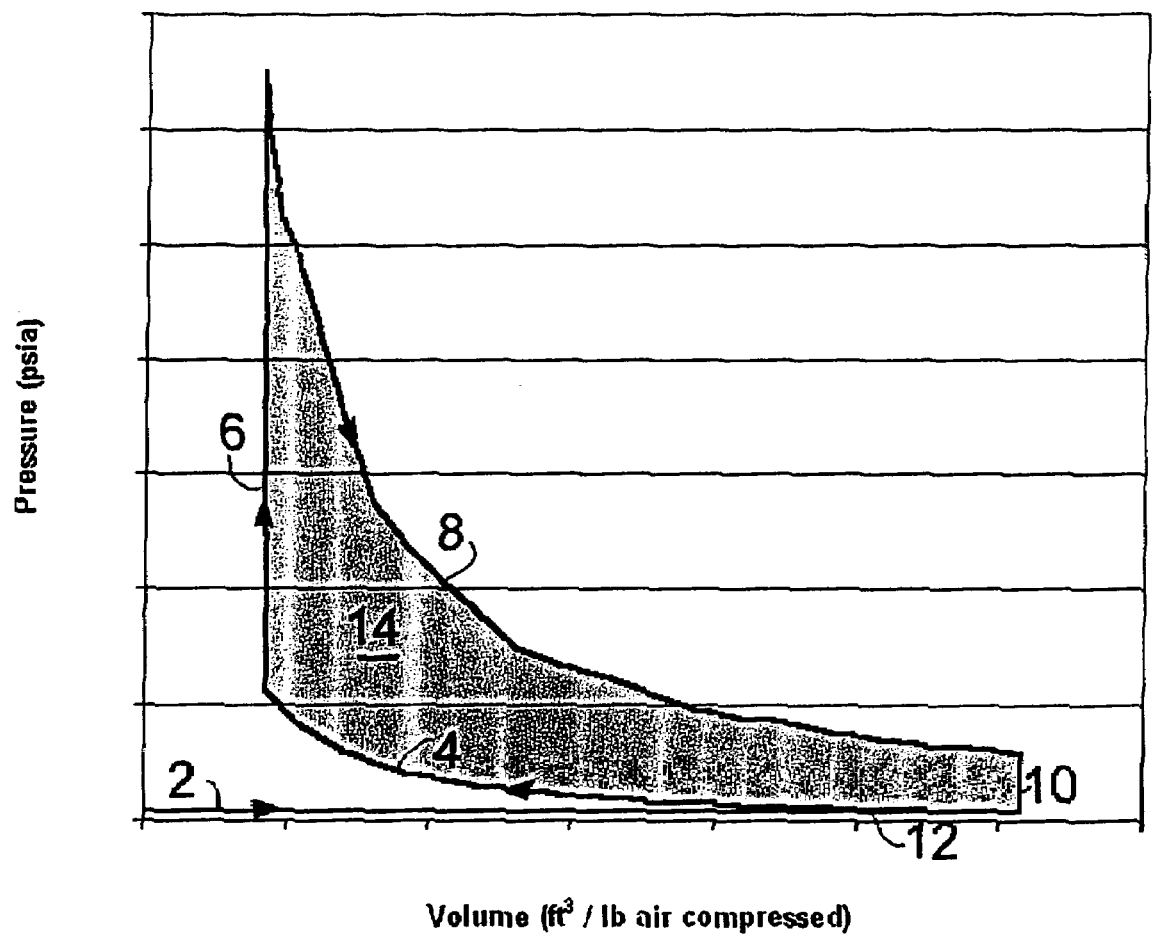
FIG. 1 is a pressure-volume diagram of an idealized Otto Cycle engine, with equal compression and expansion ratios (Prior Art).
Figure 2:
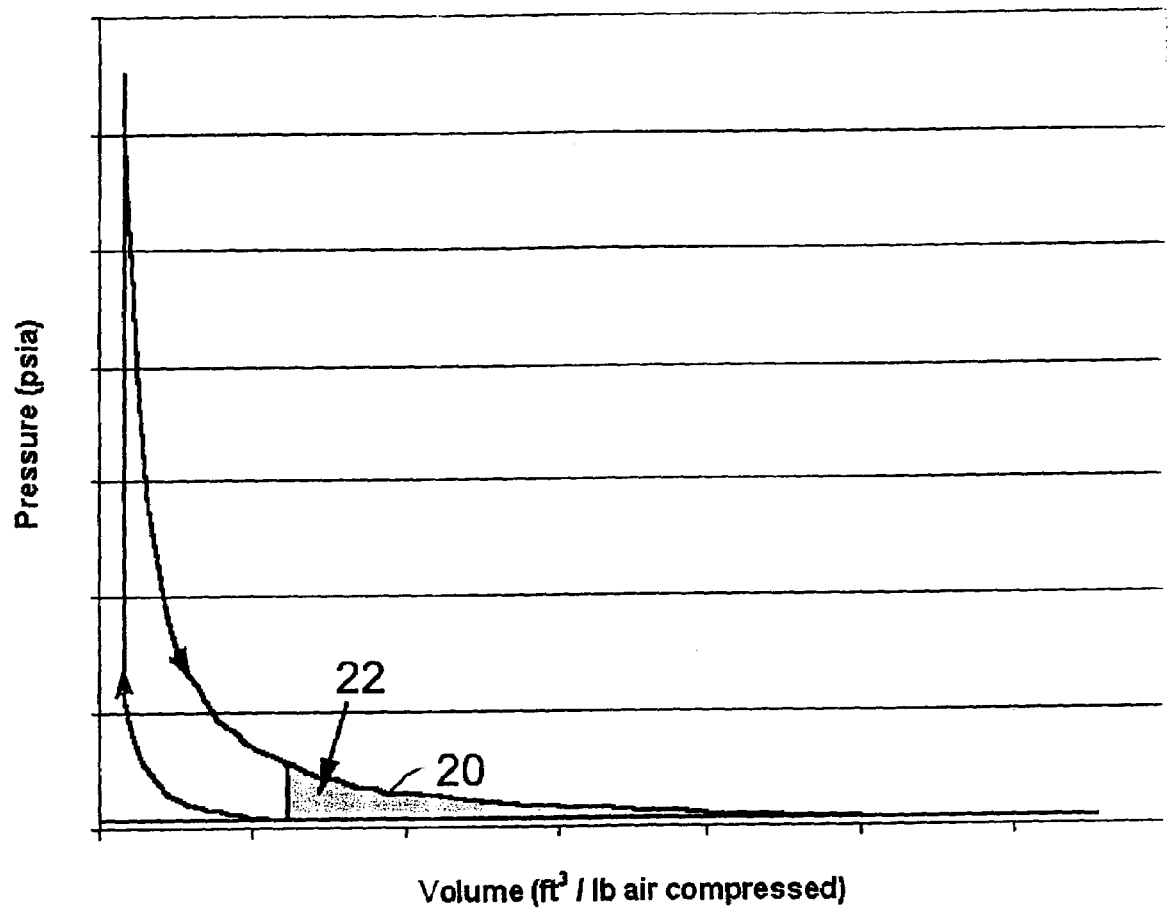
FIG. 2 is a pressure-volume diagram depicting the additional work that may be harnessed from an Otto Cycle through employing the asymmetry of a complete-expansion cycle, as provided by the present invention.
Figure 3:
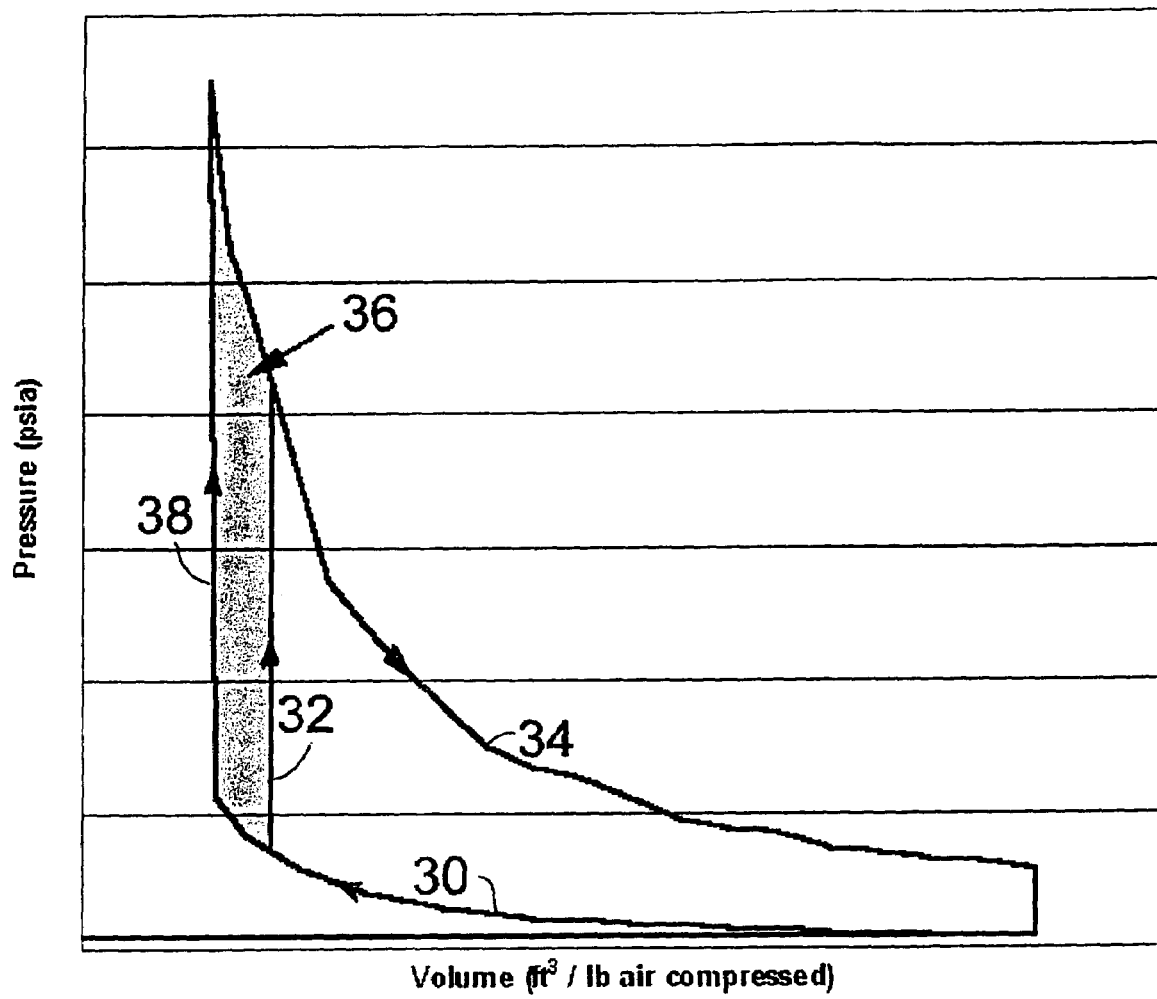
FIG. 3 is a pressure-volume diagram illustrating the loss in work that results from failure to combust at the point of maximum compression.
Figure 4:
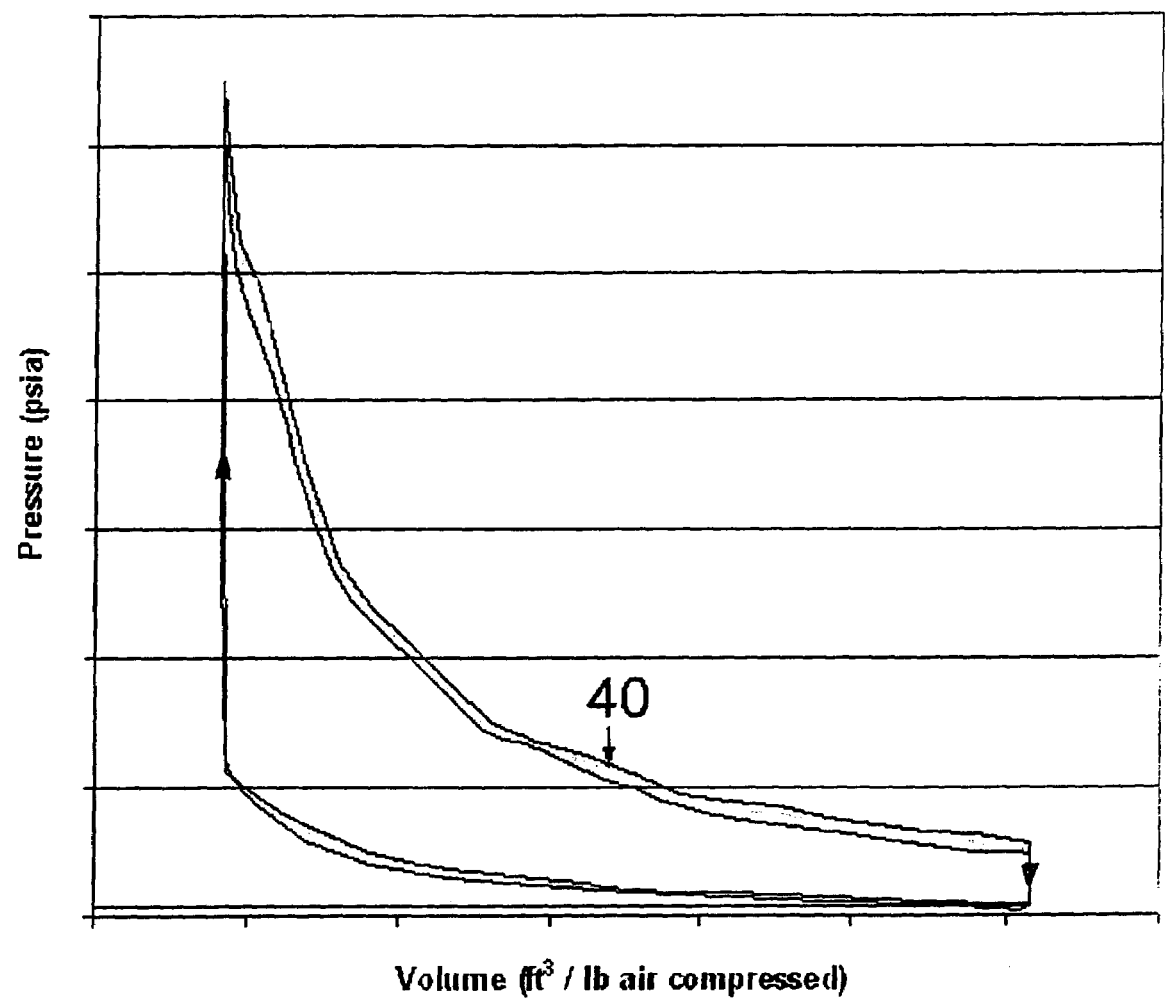
FIG. 4 is a pressure-volume diagram illustrating the loss in work that results from the removal of expanding gas prior to full expansion and the recombination of this gas at atmospheric pressure with the incoming air/fuel mixture charge.
Figure 5A:
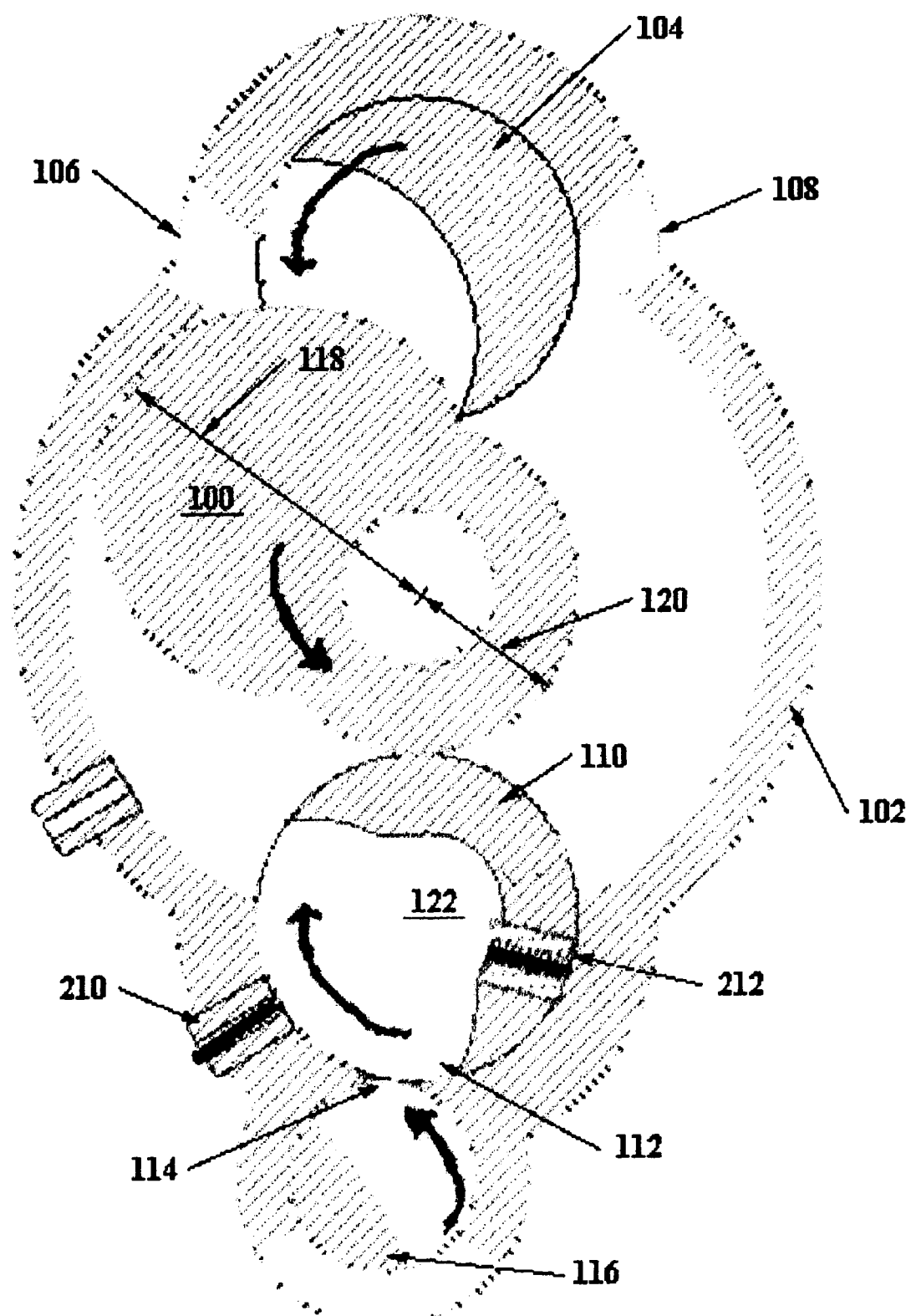
FIG. 5(a) is a conceptual diagram of an embodiment of the present invention, illustrating the relationships of the major components.
Figure 5B:
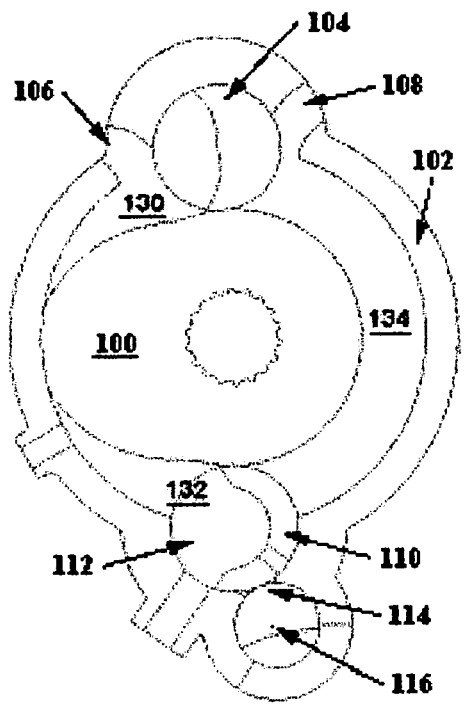
FIGS. 5(b), 5(c), 5(d), and 5(e) illustrate the preferred embodiment at four different rotational positions.
Figure 5C:
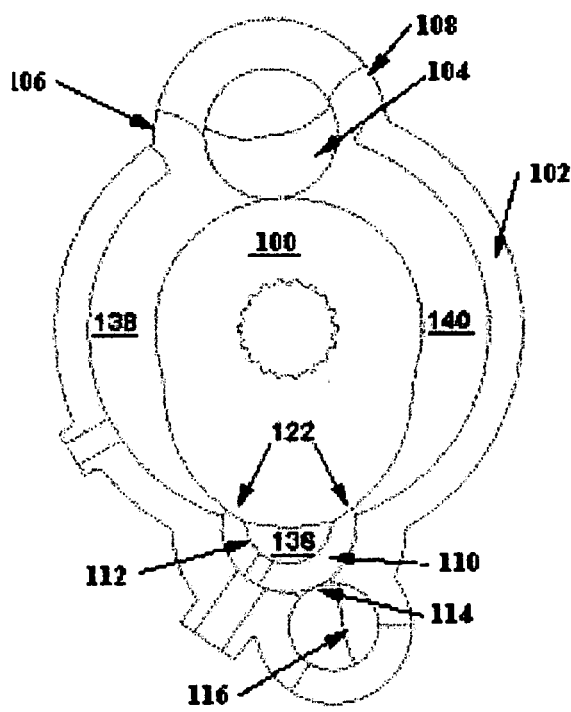
Figure 5D:
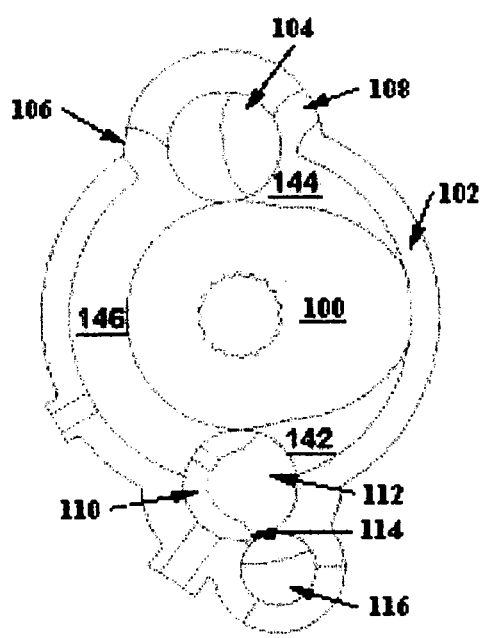
Figure 5E:
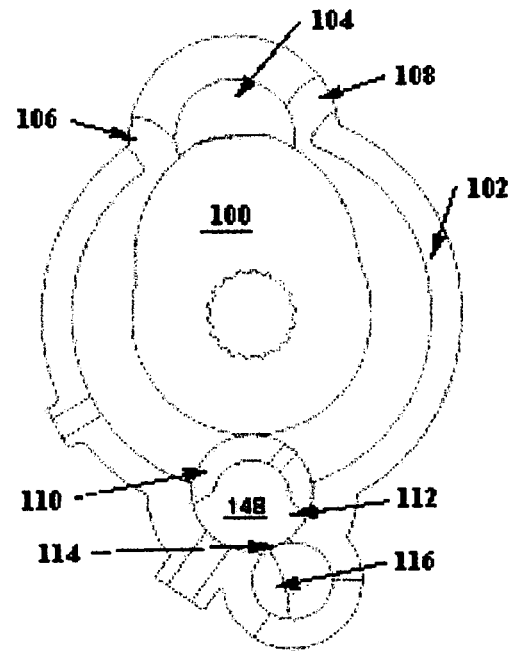

The preferred embodiment of the present invention, shown in FIG. 5(a), consists of a cylindrical housing 102 in which an oblong main rotor 100 spins. A clearance rotor 104 is located between an intake port 106 and an exhaust port 108 and rotates partially within the main cylinder so as to engage and form seals with the main rotor 100. A compression rotor 110 is also located to spin partially within the main cylinder so as to engage and form seals with the main rotor. The compression rotor also serves substantially as the combustion chamber for the cycle. The cylinder 112 in which the compression rotor spins is fit with an exhaust port 114, through which spent gases may be purged by un-fueled air. A purge rotor 116 is connected to this compression rotor exhaust port, enabling the port to be cyclically opened and closed. The four rotors 100, 104, 110, 116 are geared, external to the cylindrical housing via drive shafts on each rotor such that they spin with the same angular velocity. The exact geometry of each component is determined to create precise seals, compression and expansion ratios, and exhaust purging as the main rotor 100 revolves within the engine, while complying with the aforementioned design criteria.

Besides acting as the working surface and torque arm of the engine, the main rotor 100 serves to separate volumes of gas held within the engine. To accomplish this, the main rotor is constructed with two principal radii. The main radius 118 is designed to create a seal with the exterior of the main cylinder 102 while the main rotor is not engaged with the peripheral rotors. The opposite side of the main rotor has a lesser radius 120 designed to create a seal with closed-sides of the peripheral rotors.

The clearance rotor 104 is designed to engage the main radius of the main rotor, allowing it to rotate past, while maintaining maximum sealing area throughout the contact. The compression rotor 110 is designed to engage the main rotor's main radius, forming a seal inside of one or both edges 122, allowing the main rotor to rotate past.

During a revolution, the engine is divided by the rotors into six volumes in which the thermodynamic conversions take place, as shown in FIGS. 5(b), 5(c), 5(d) and 5(e). When the main rotor is located between the clearance rotor and the compression rotor, the main rotor separates the intake volume 130 behind the rotor from the compressed volume 132 ahead of the rotor. The clearance and compression rotors separate these volumes from spent gas 134 located on the opposite side of the engine. When the main rotor becomes aligned with the compression rotor and the engine reaches the point of maximum compression, the seals 122 on either side of the compression rotor separate the compressed volume 136 from the clean intake volume 138 and the spent gas 140, both at atmospheric pressure. After combustion, the main rotor separates the expanding combustion products 142 behind the rotor from the spent gas 144 being purged from the engine ahead of the rotor. The seals between the main rotor and the clearance and compression rotors isolate these volumes from the fresh intake volume on the opposite side of the engine 146. When the main rotor becomes aligned with the clearance rotor, the compression rotor is turned away from the main rotor, entrapping pressurized spent gas 148. This gas is allowed to vent through the compression purge rotor 116, and is nearly fully expelled by clean airflow at the beginning of the compression stroke.

Figure 6:
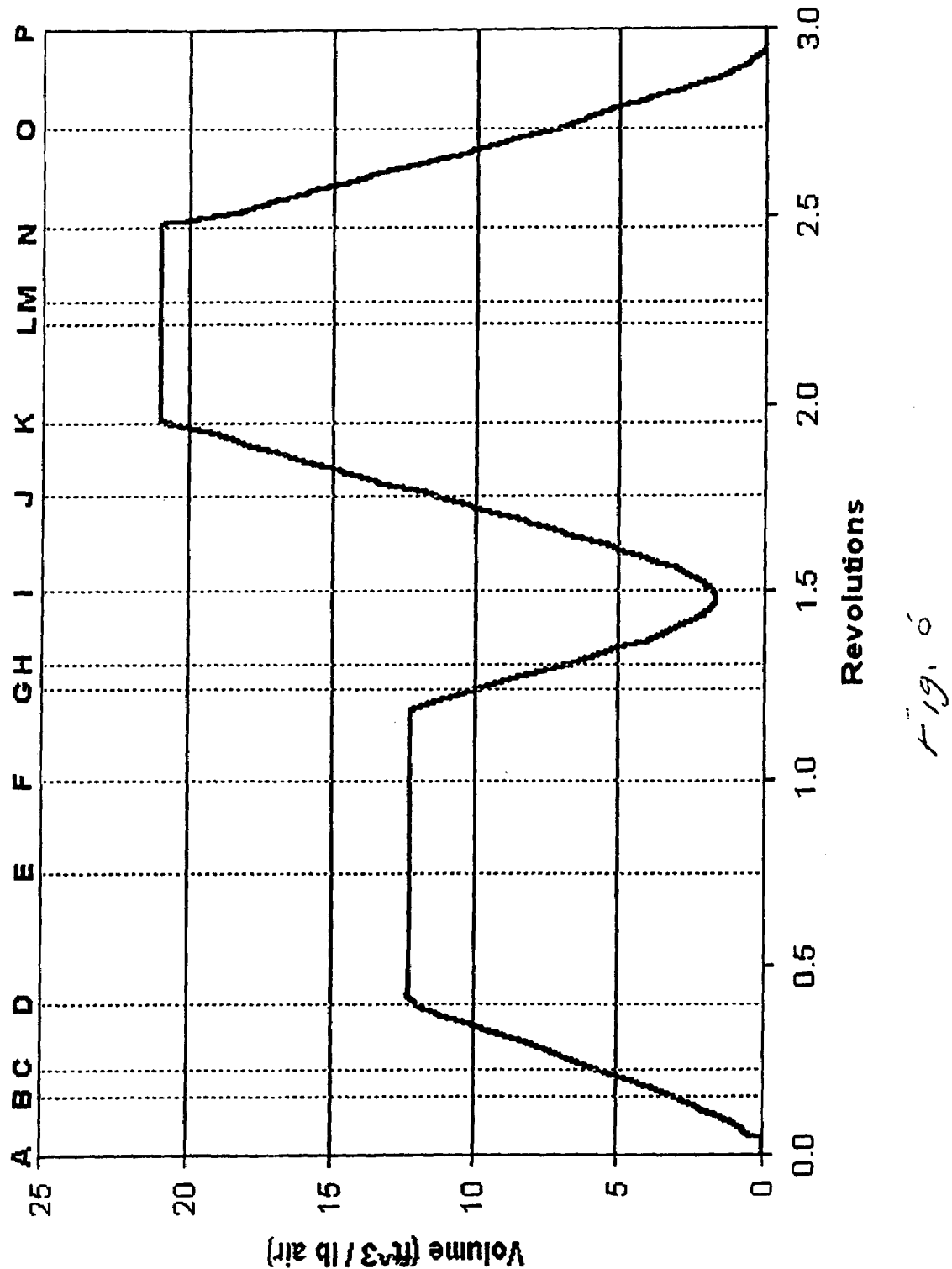
FIG. 6 is a plot of volume versus rotor angle, showing the volume of a charge of air passing through the engine, from intake to exhaust, with rotor positions "a" through "p" identified on the plot.

To examine the cycle performed by the engine of the preferred embodiment more fully, it is beneficial to follow a volume of air through the engine, as shown in FIG. 6 and FIGS. 7(a)-7(p). FIG. 6 shows the volume of a charge of air during the three complete revolutions of the main rotor, with specific points identified as "A" through "P", corresponding to diagrams 7(a) through (p). As the main rotor moves between the clearance and the compression rotors, a volume of air 200 is pulled into the engine by the retreating rotor [7(a)-7(d)]. As the rotor continues to rotate back to the clearance rotor [7(e)], this volume is not affected 202, except by shear forces from the surface of the back of the main rotor. When the main rotor passes the intake port [7(t)], the compression and purge rotors are aligned such that forced air may purge the residual spent gas from the compression rotor 204 to ensure very little exhaust carry-over. As the main rotor continues to rotate, fuel is injected and the charge of air/fuel mixture is compressed into the combustion chamber 206. When the main rotor is aligned with the combustion chamber [7(i)], a spark is introduced to the chamber, initiating combustion 208. In the preferred embodiment, this sparking current travels through a ceramic insulated conduit which aligns appropriately with a similar ceramic insulated conduit installed in the compression rotor at the rear of the combustion chamber, the current jumps the gap between conduits at points 210 and 212 to an ignition spark gap on the inner face of the combustion chamber in the compression rotor. Expansion of the combustion products occurs [7(j)] as the main rotor continues to rotate 214, exerting work, until the main rotor passes the exhaust port [7(k)] and the pressure is reduced to atmospheric by venting 216. As the rotor continues to move past the clearance rotor and on to alignment with the compression rotor [7(l)-7(m)], this volume of spent gas is unaffected, with the exception of shear forces 218. The cycle is finished as the main rotor travels from the compression rotor to the clearance rotor, expelling the spent gas through the exhaust port 220 [7(n) and 7(0)]. The rotor completes the cycle and returns to its original orientation [7(p)].

Figure 7:
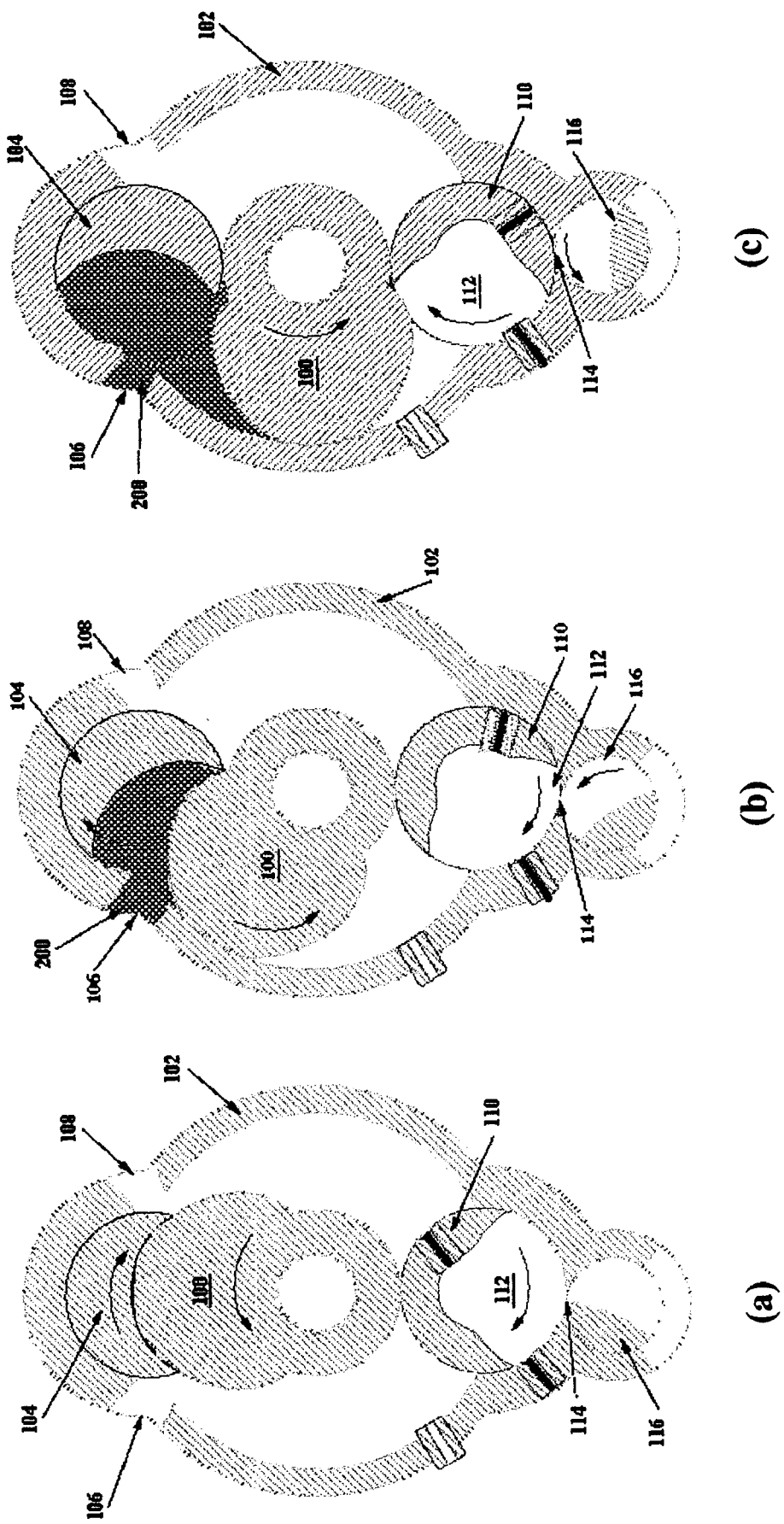
FIGS. 7(a) through 7(p) follow a volume of air through the present invention to illustrate the processes undergone by the volume.
Figure 7:
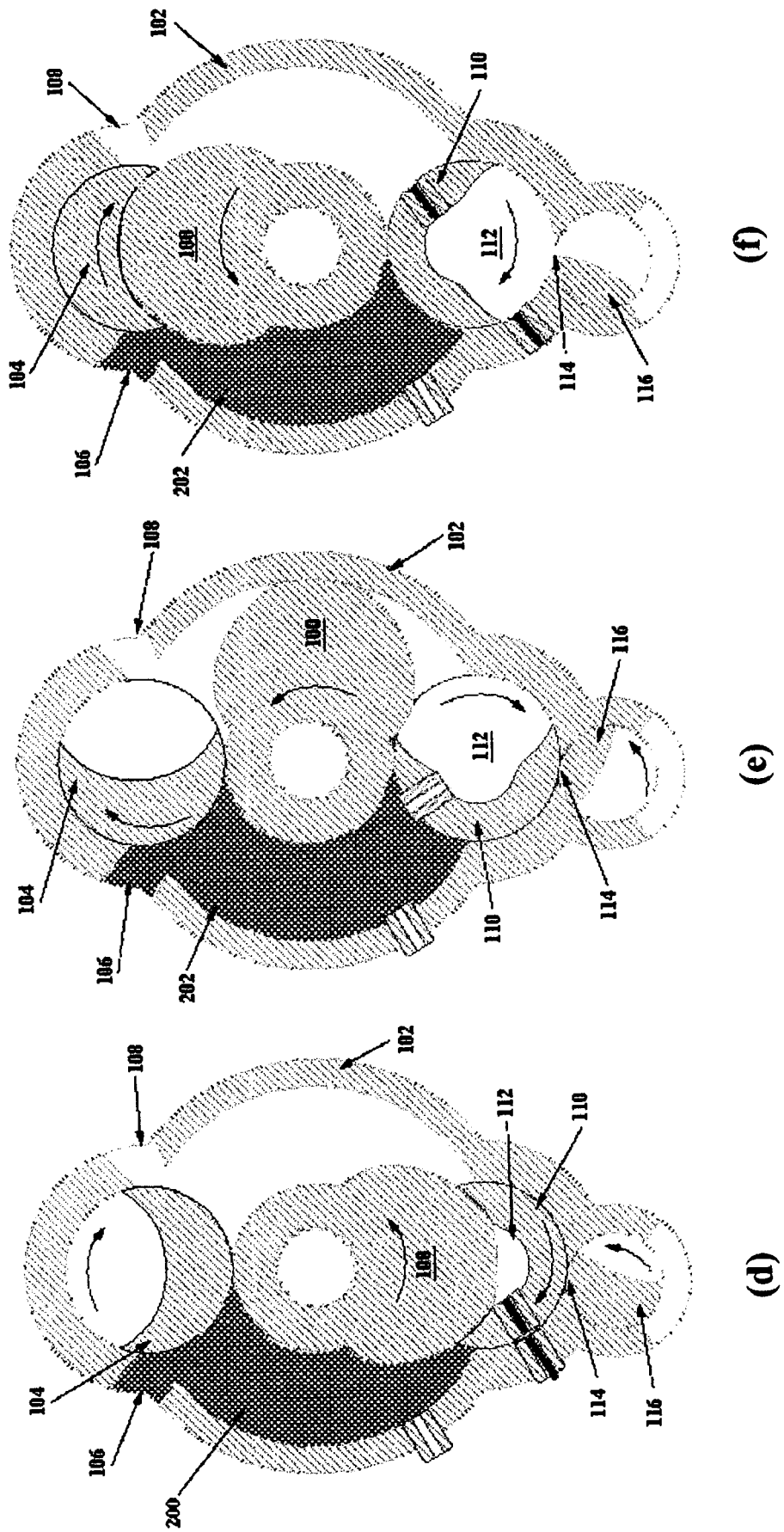
Figure 7:
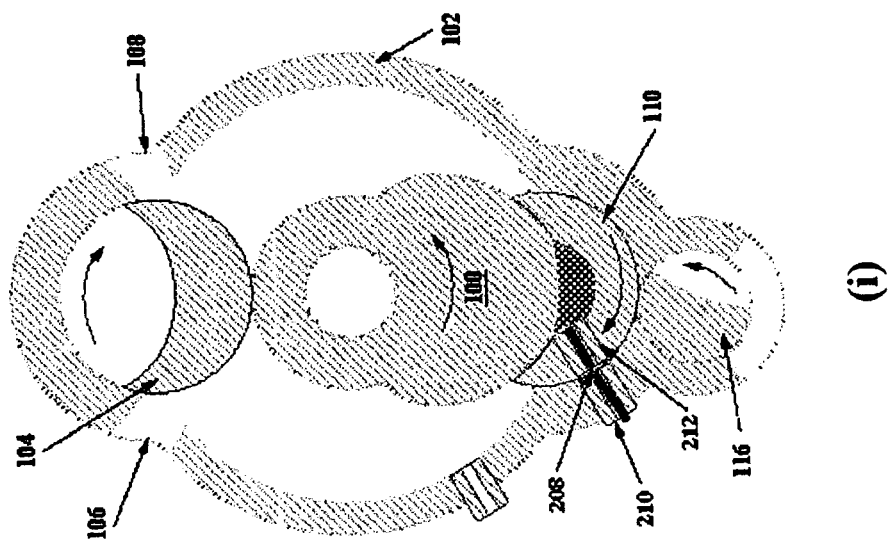
Figure 7:
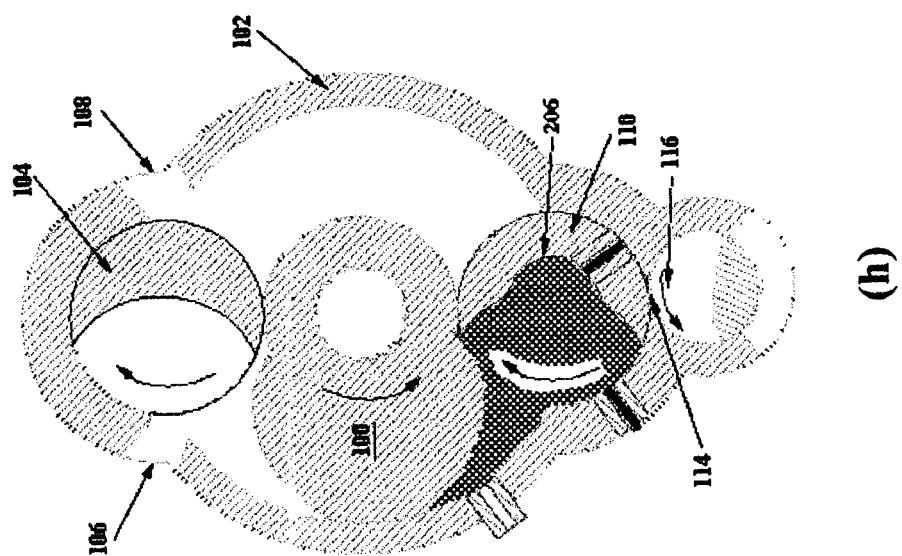
Figure 7:
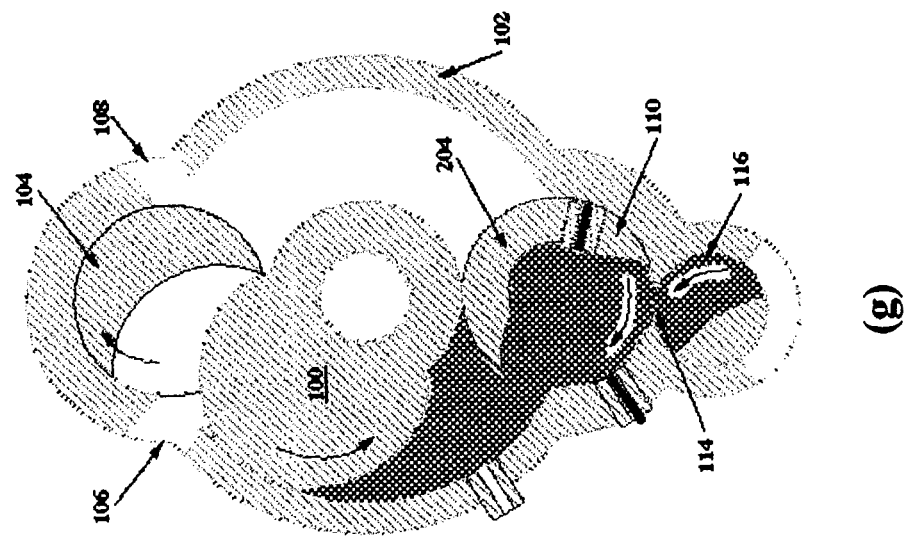
Figure 7:
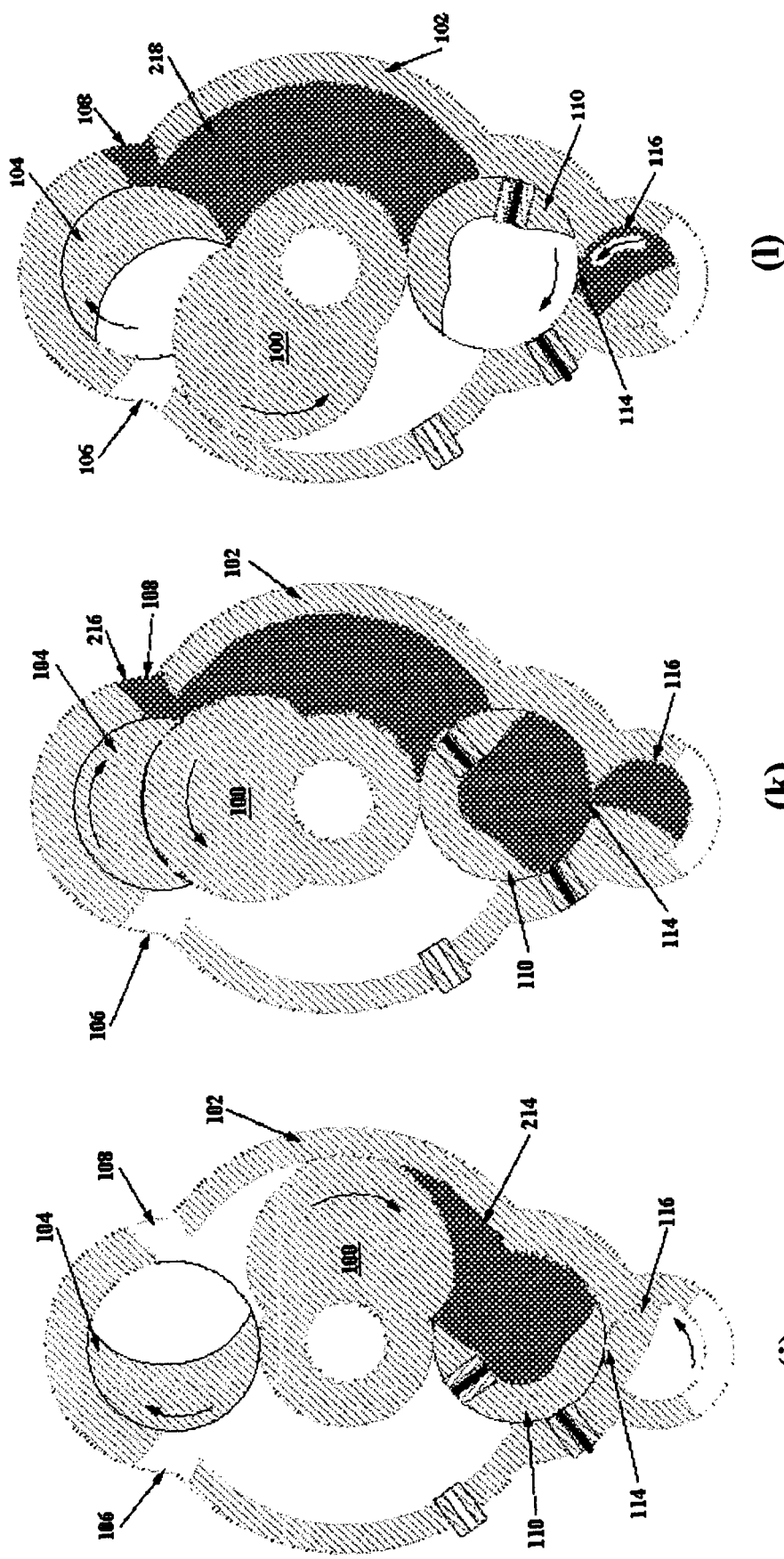
Figure 7:
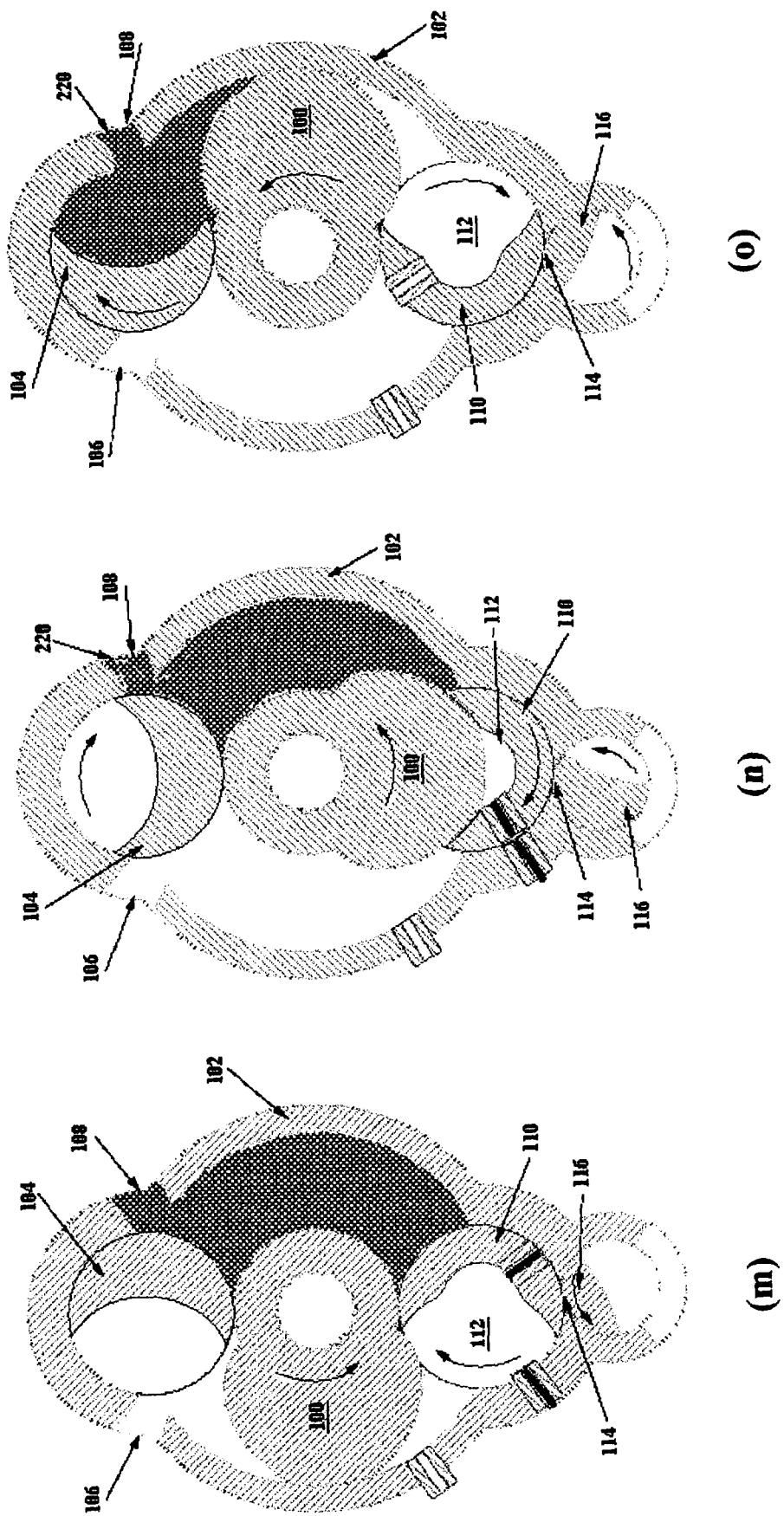
Figure 7:
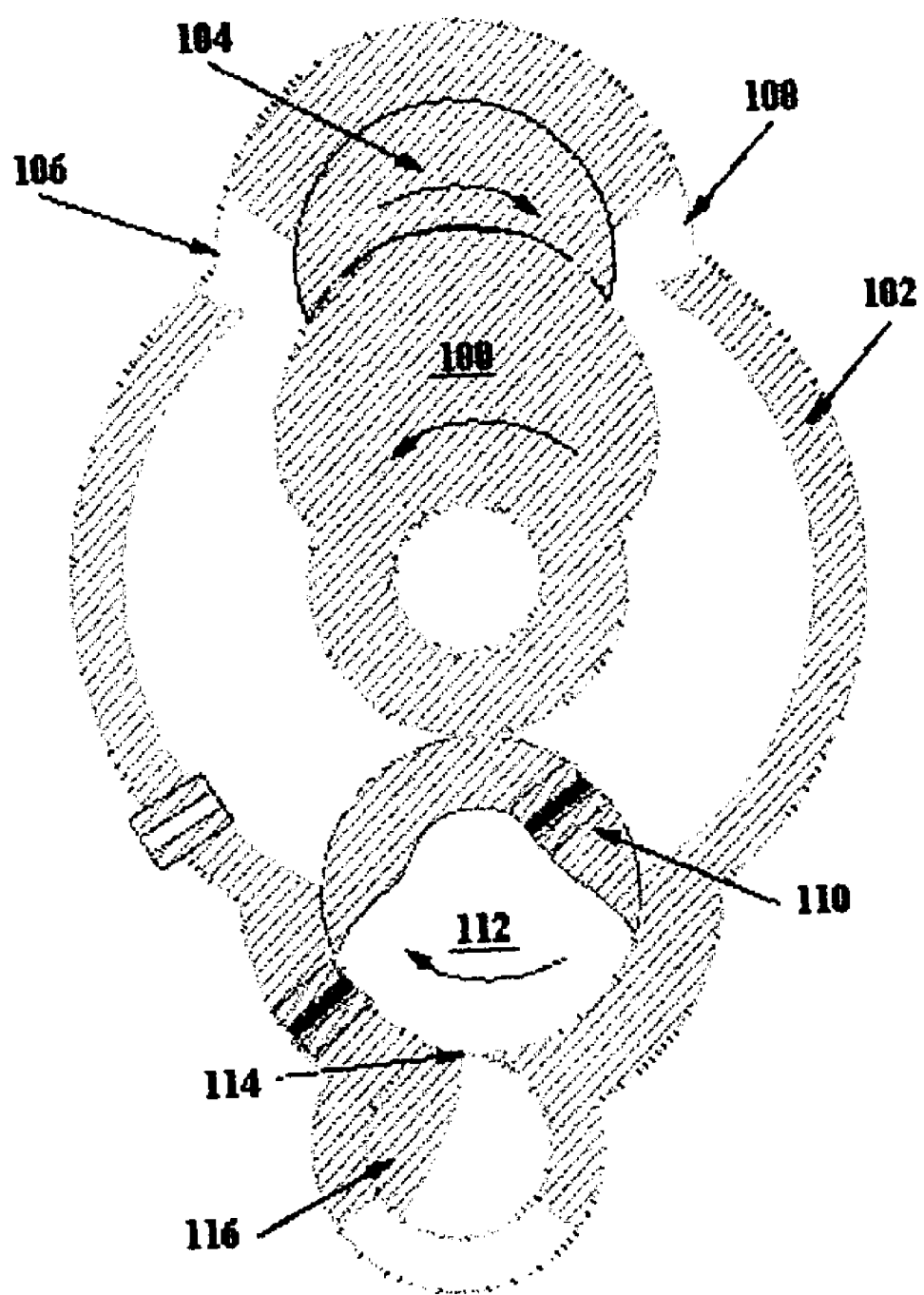
Figure 8:
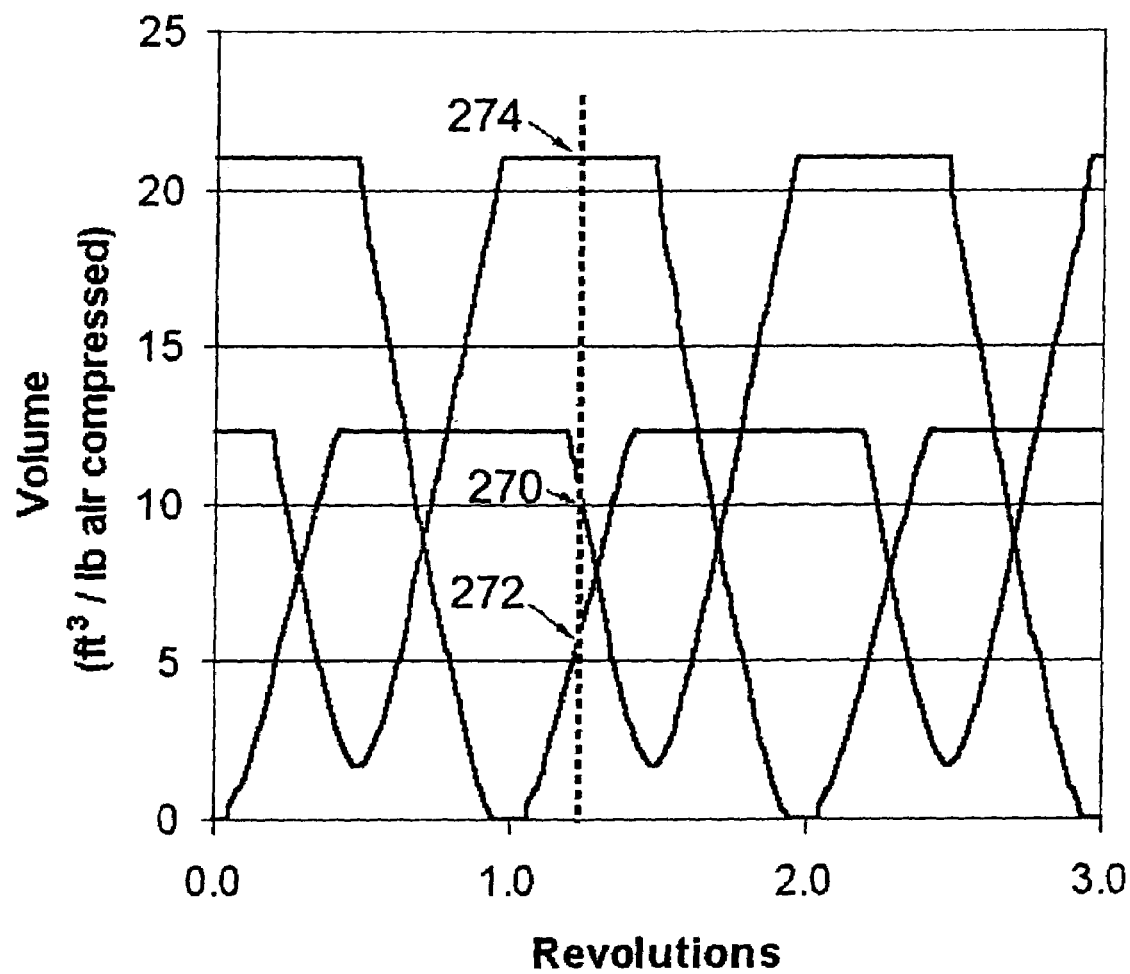
FIG. 8 illustrates how three cycles are concurrently ongoing in the engine.

FIGS. 6 and 7 show that three full revolutions, or 1,0800 of rotation, are required to complete a thermodynamic cycle for each working volume of air. However, because the rotors sequester the volumes of gas within the engine, three cycles (with three separate working volumes) are performed by the engine concurrently, as shown in FIG. 8. As intake of one cycle is occurring 270, the second cycle is in compression 272, and the third cycle's exhaust is stagnant 274 (being sheared). Each revolution of the main rotor yields a combustion and power stroke, as can be seen by the pressure spike seen in FIG. 9, and collectively in FIG. 10. This means that the engine is able to perform in one revolution what four-stroke reciprocating engines perform in two revolutions.

Figure 9:
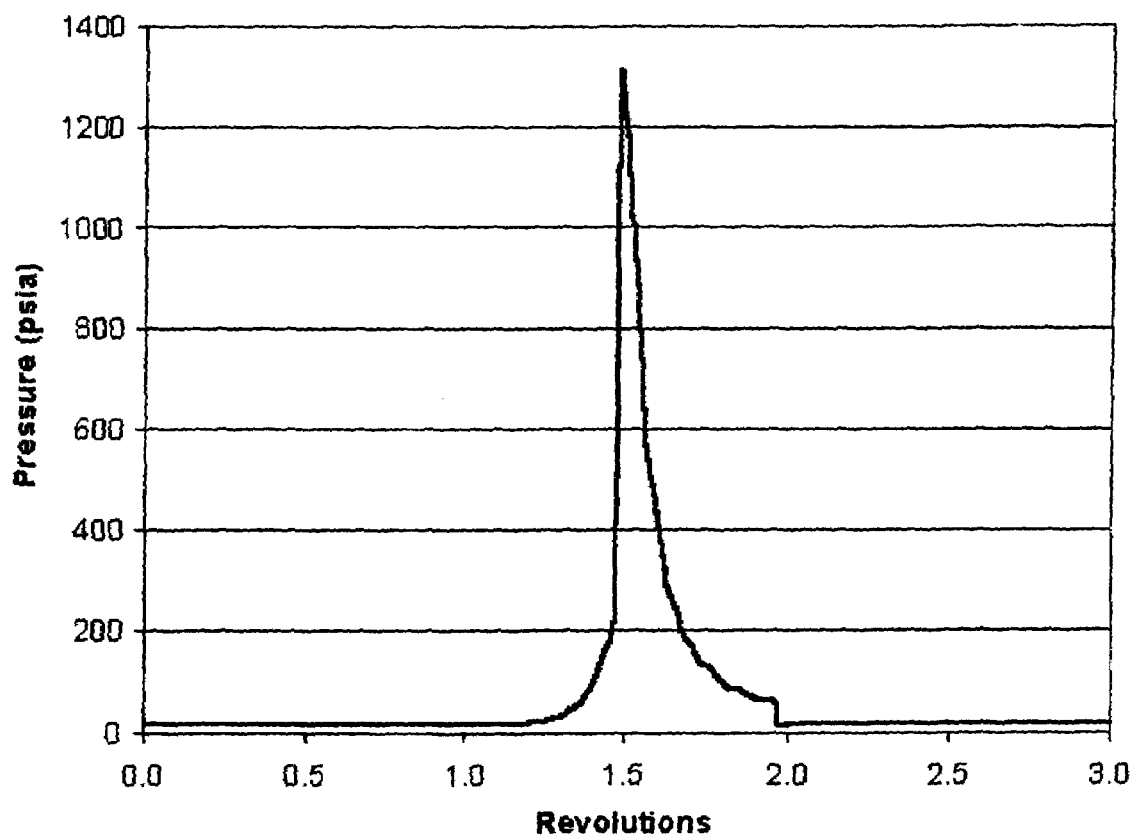
FIG. 9 shows the pressure characteristic of the volume described in FIG. 8.
Figure 10:
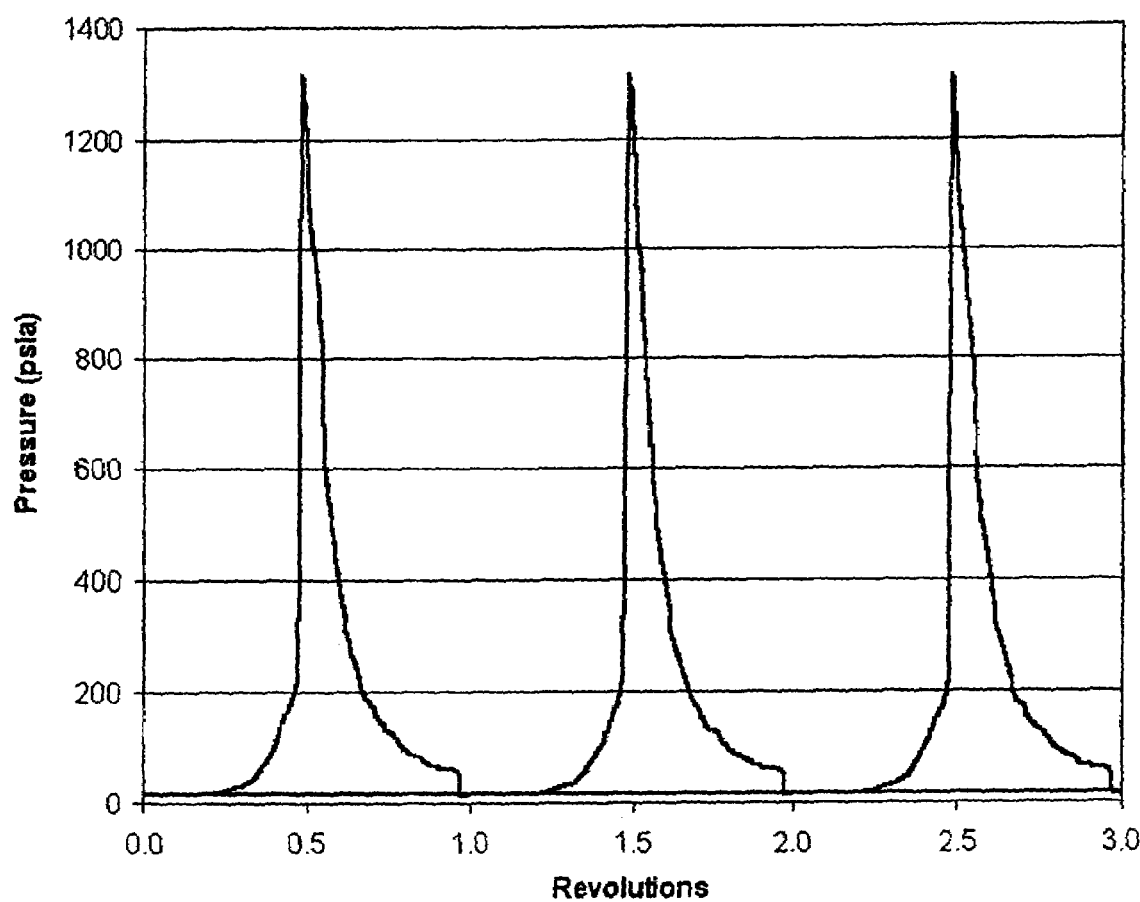
FIG. 10 illustrates that each cycle generates a pressure spike and an associated power stroke.
Figure 11:
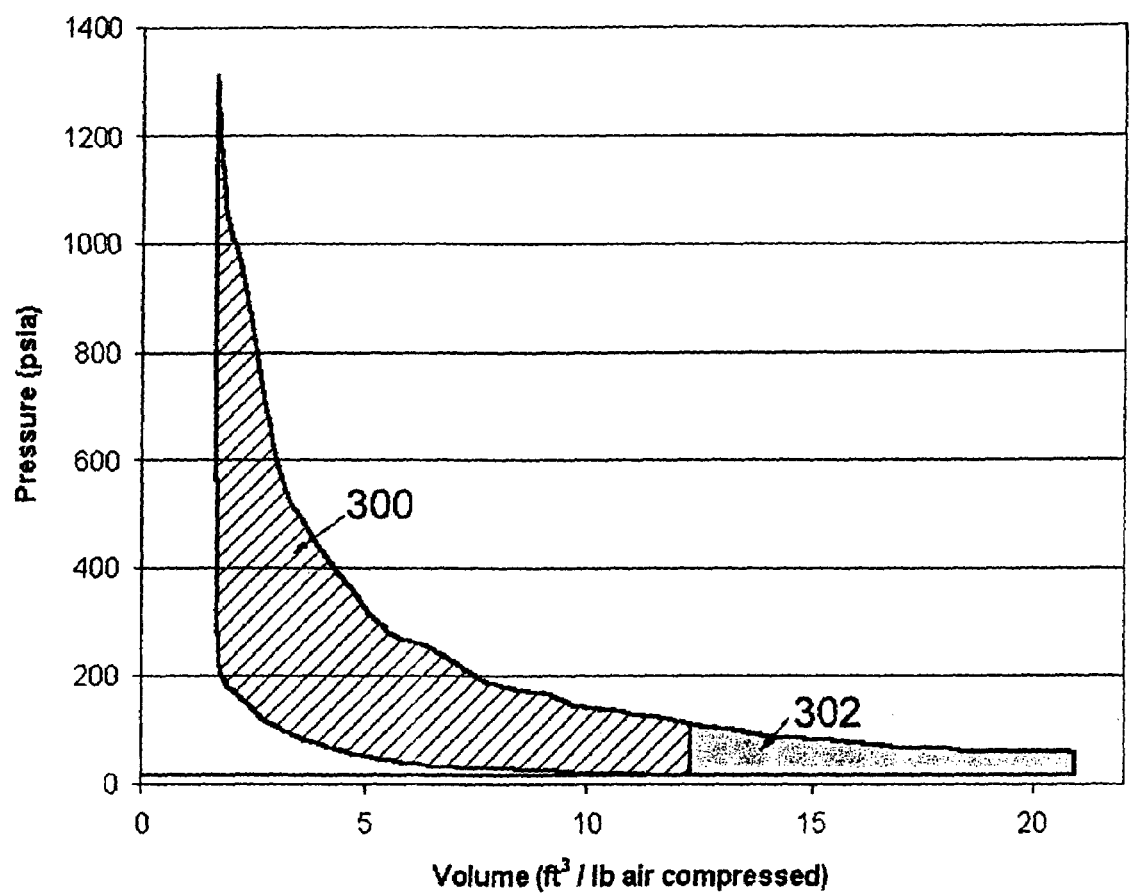
FIG. 11 illustrates the pressure-volume relationship characteristic of the first embodiment of the present invention, as determined by Newhall-Starkman analysis.

Thermodynamic analysis of the present invention, performed using the Newhall-Starkman method, yields the pressure-volume relationship shown in FIG. 11. The ignition point in the preferred embodiment is located approximately 115° counterclockwise of the clearance rotor, yielding a compression ratio of 7.4, and an expansion ratio of 12.2. The pressure-volume relationship for this design, derived for a pound mass of air with an ideal fuel mixture ratio at an intake temperature of 540° R (80° F.) and with zero residual spent gas carry-over, is shown for a single working volume in FIG. 11. The working volume vs. rotation of the main rotor for a single engine cycle is shown in FIG. 9. The pressure of a charge of air, as can be seen in FIG. 11, is atmospheric for the majority of cycle, with a peak in pressure following the combustion of the air/fuel mixture. In full operation, three cycles operate concurrently, as can be seen in FIGS. 8 and 10.

In order to illustrate the improvements implicit in the present invention when compared to previous rotary engines, Newhall-Starkman analysis was performed on the standard Otto Cycle, the present Complete-Expansion Cycle, and on the Otto Cycle modified in ways characteristic of previous cited inventions. To perform these analyses, a 1 pound mass of air, initially at 14.7 psi and 540° R, was followed through a cycle with a compression ratio of 7.4. Results for the work produced by the idealized Otto Cycle 300 and the additional work produced from the expansion asymmetry of the present invention 302 are shown in FIG. 11. Under these conditions, the idealized Otto Cycle yields 524 Btu/lb air and has a thermodynamic efficiency of 38.3%; considerably less than found for the Ideal Otto Cycle using Eq. (1). The present invention yields a thermodynamic efficiency of 45.6% or 19% higher than the idealized Otto Cycle. It also carries a power density of 624 Btu/lb air, or 1.62 hp/in 3 compression volume at 2500 rpm (without deduction of mechanical inefficiencies). If the expansion ratio of this engine is reduced to 5 as might be found in a design with negative asymmetry, the thermodynamic efficiency is reduced to 34.3%. Carryover of one combustion volume (at atmospheric pressure) of spent gas into the incoming fuel/air charge reduces the thermodynamic efficiency of the engine to 35.6%. In designs that incorporate more than one of these efficiency-reducing characteristics, the reduction in efficiency would be even greater.

One of the features of the present engine design is that the geometry of individual components may be altered to change performance characteristics while maintaining overall performance. For example, the compression chamber may contain a larger or smaller cavity to increase or decrease the compression ratio without deviating from the calculated Complete-Expansion Cycle performance shown in the preferred embodiment. Combustion may be initiated from several points around the inside of the chamber to accelerate the flame front progression in larger diameter engines. The volume of fresh air which may be flushed through the compression rotor to expel the residual spent gas may be adjusted by altering the size and location of the purge rotor aperture. Addition of a rotor at the intake port can also enhance the purge volume forced through the compression rotor. More highly developed asymmetry may also be achieved by rotating the location of the compression rotor towards the intake port, creating a larger expansion to compression ratio. Addition of a rotor at the exhaust port can further extend the expansion volume, enabling additional work to be captured from each expansion. The ability to maintain near-idealized Complete-Expansion Cycle pressure ratios vs. standard Otto Cycle performance while altering these parameters has widespread benefits ranging from the ability to change the fuel combusted to the ability to operate with the low density air intake typical of aviation applications. However, in the preferred embodiment, many of these adjustments are not included in the interest of simplicity of design.

Figure 12:
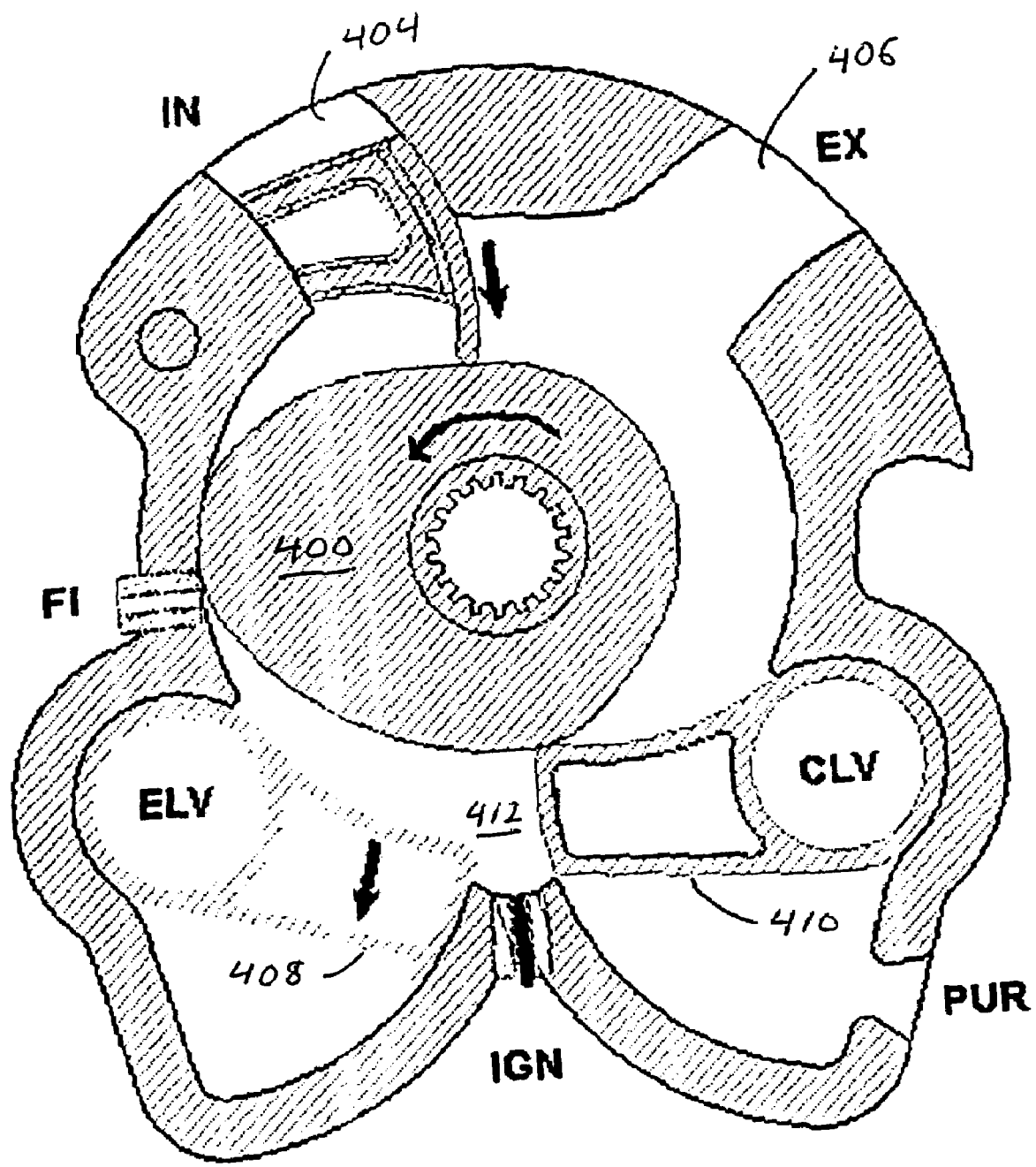
FIG. 12 illustrates a first alternate embodiment of a rotary engine capable of achieving the thermodynamic cycle of the present invention in which the compression rotor is replaced by two lobe valves.

The engine of the first alternate embodiment is also capable of achieving the Peitzke Cycle (FIG. 12). As can be seen from FIGS. 13 and 14(a) through 14(t), three complete revolutions are still required to move each volume of air through the engine, with one power stroke per revolution, just as in the previous engine design. The main rotor 400, intake port 404 and exhaust port 406 are very similar to the previous engine design. However, the compression and purge rotors are removed and replaced with an expansion lobe valve 408 and a compression lobe valve 410.

Figure 13:
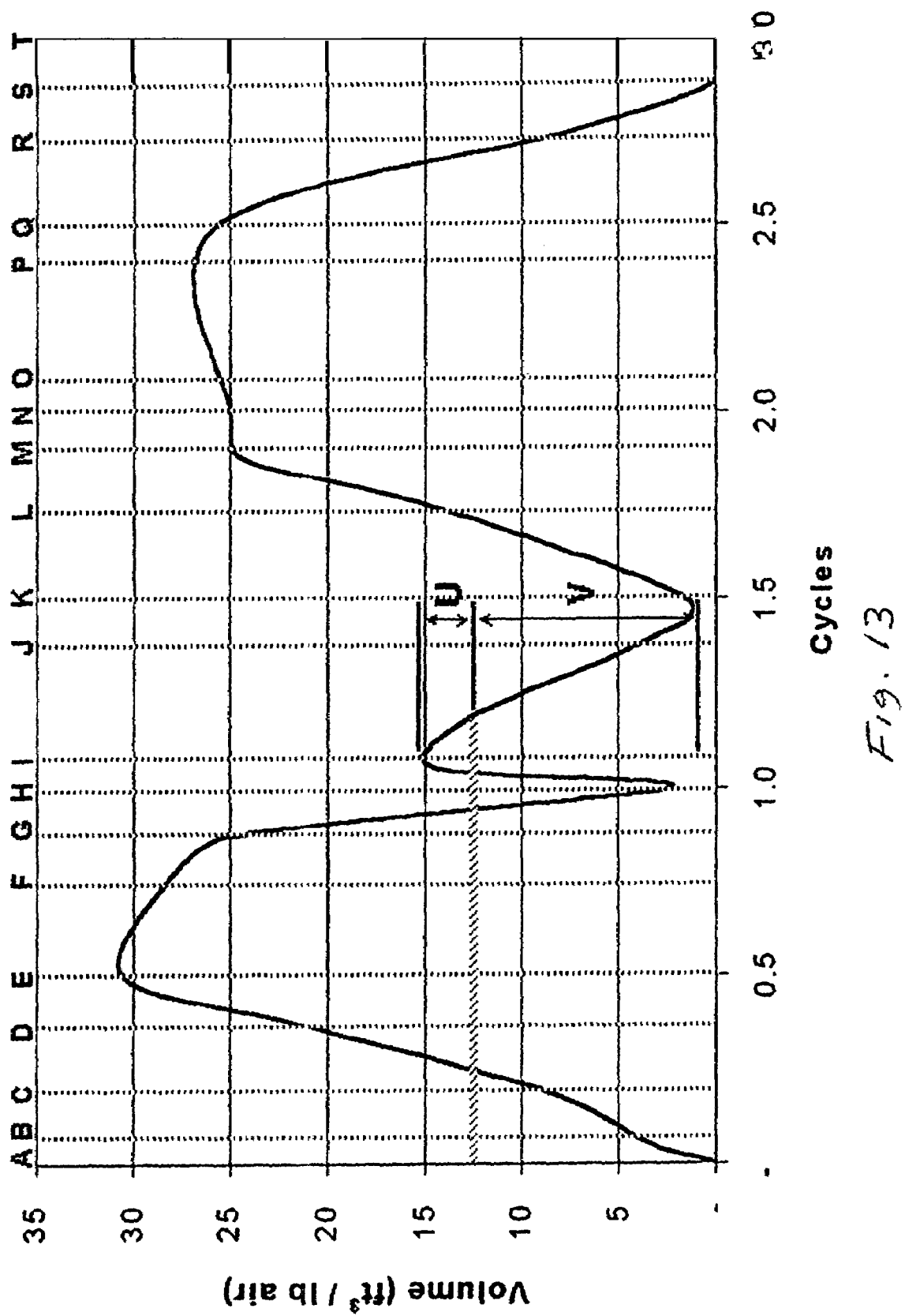
FIG. 13 is a plot of volume versus rotor angle for the first alternate embodiment, showing the volume of a charge of air passing through the engine, from intake to exhaust, with rotor positions "a" through "t" identified on the plot.
Figure 14:
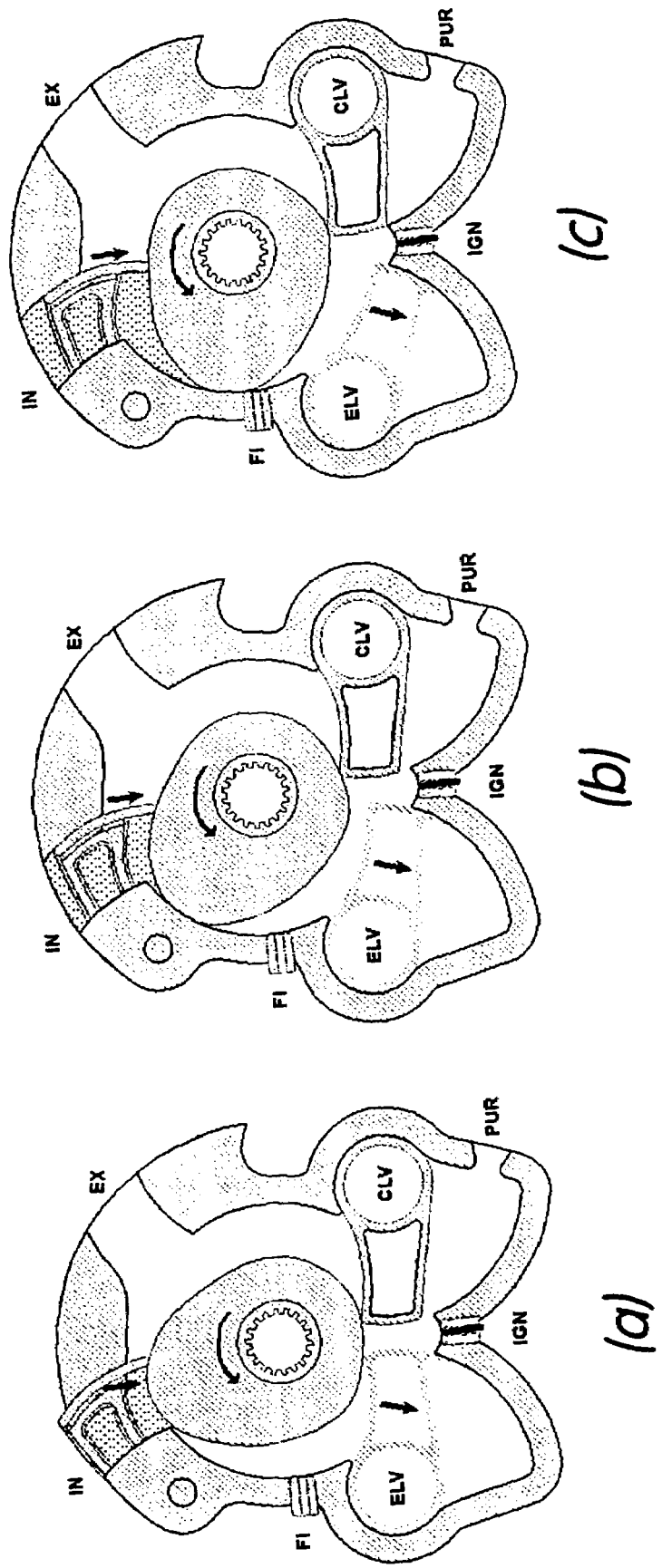
FIGS. 14(a) through 14(t) follow a volume of air through the first alternate embodiment of the present invention to illustrate the processes undergone by the volume.
Figure 14:
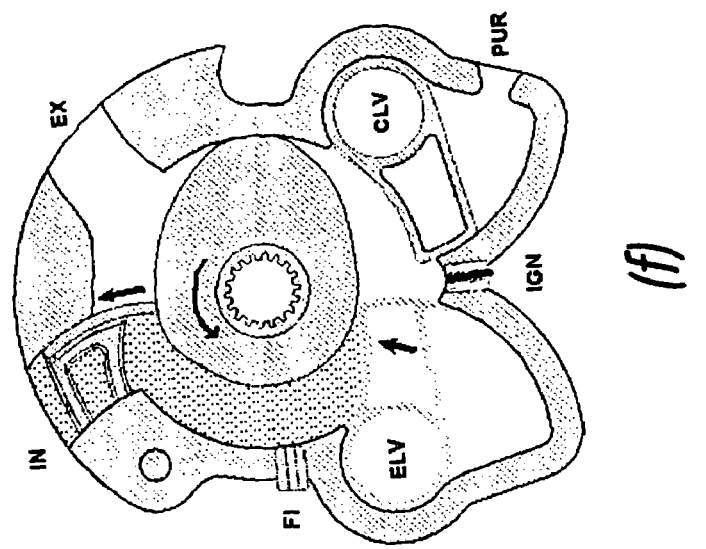
Figure 14:
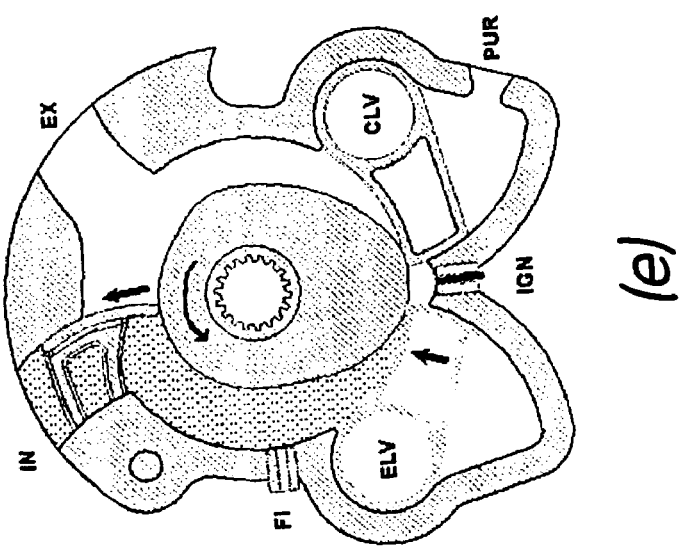
Figure 14:
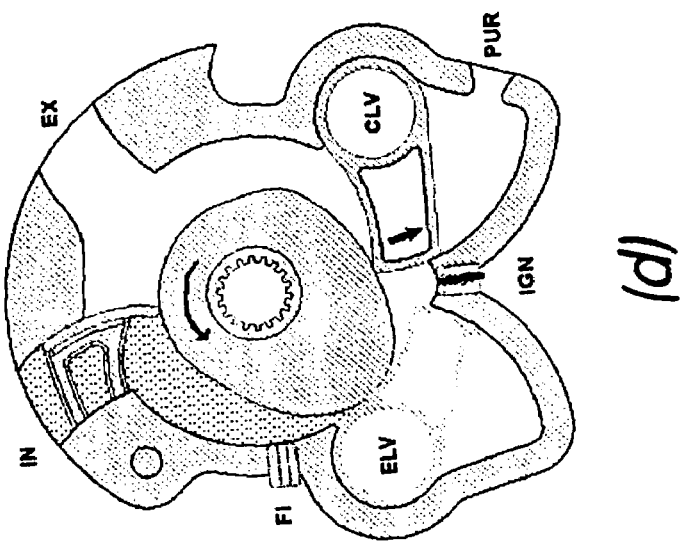
Figure 14:
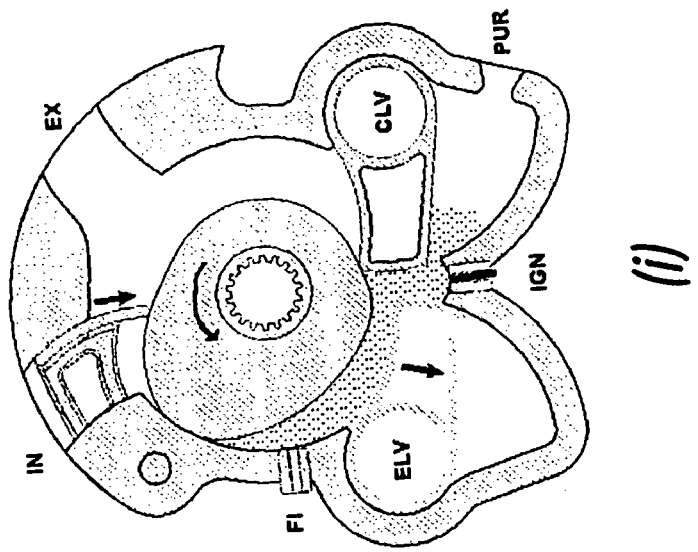
Figure 14:
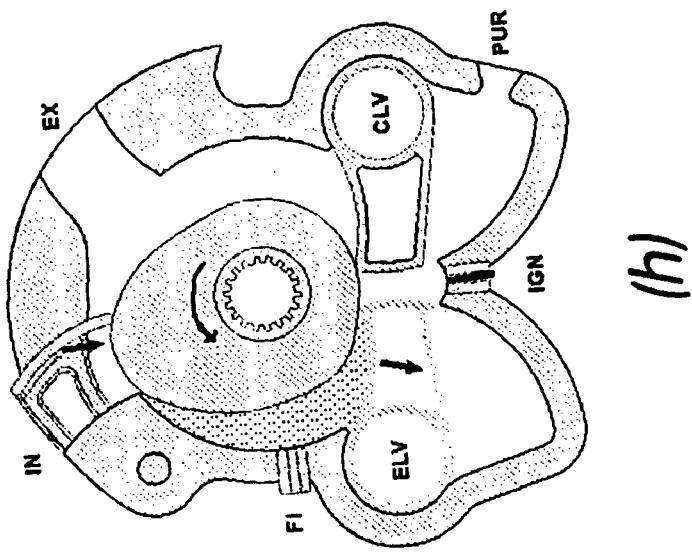
Figure 14:
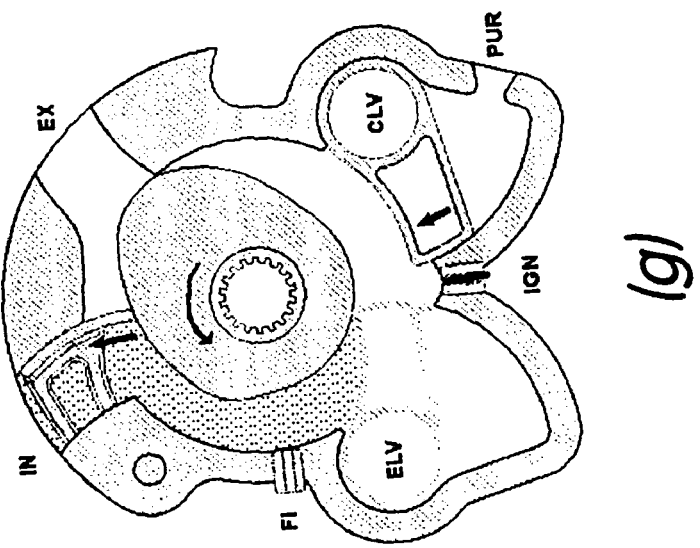
Figure 14:
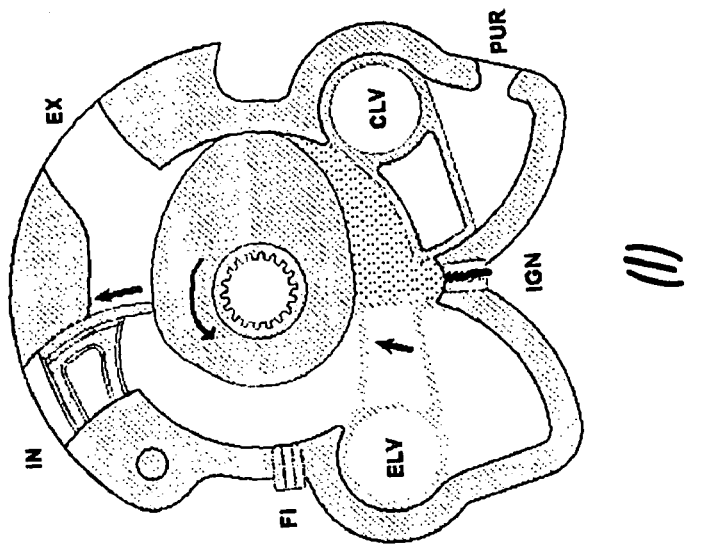
Figure 14:
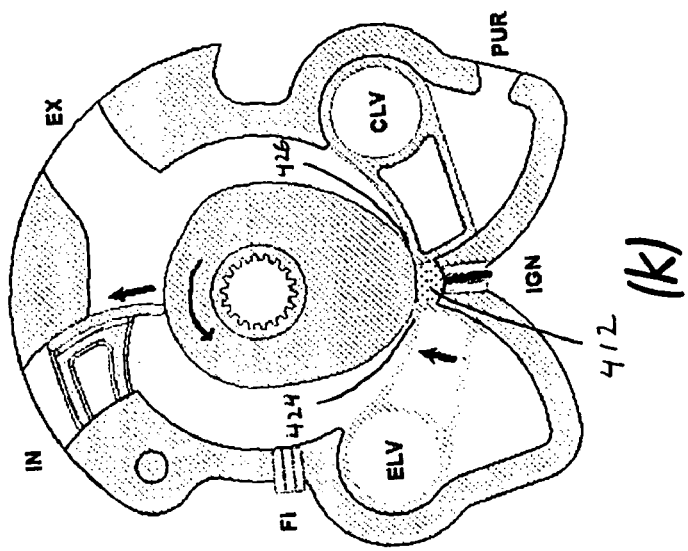
Figure 14:
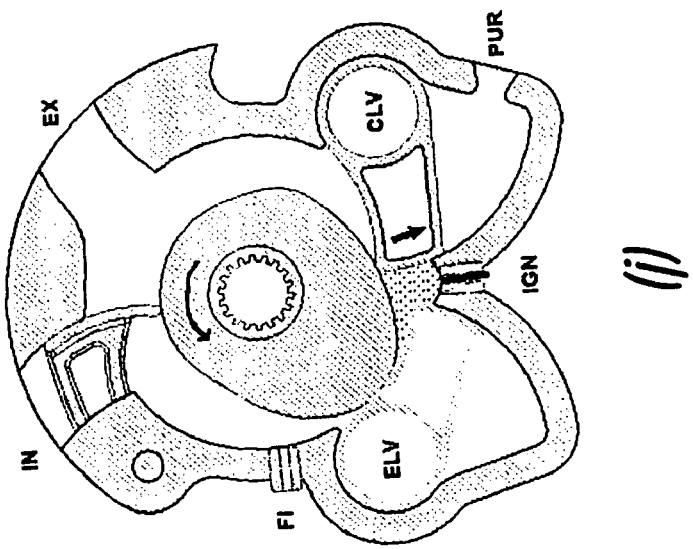
Figure 14:
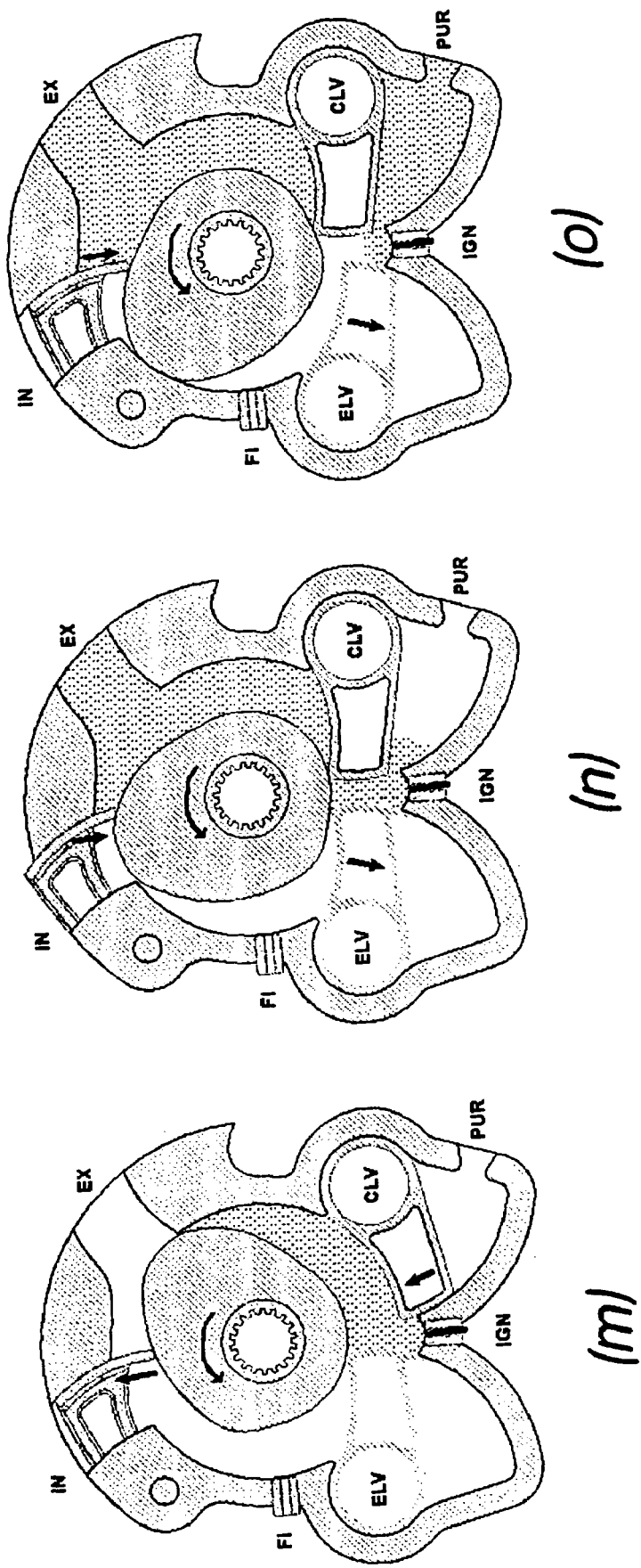
Figure 14:
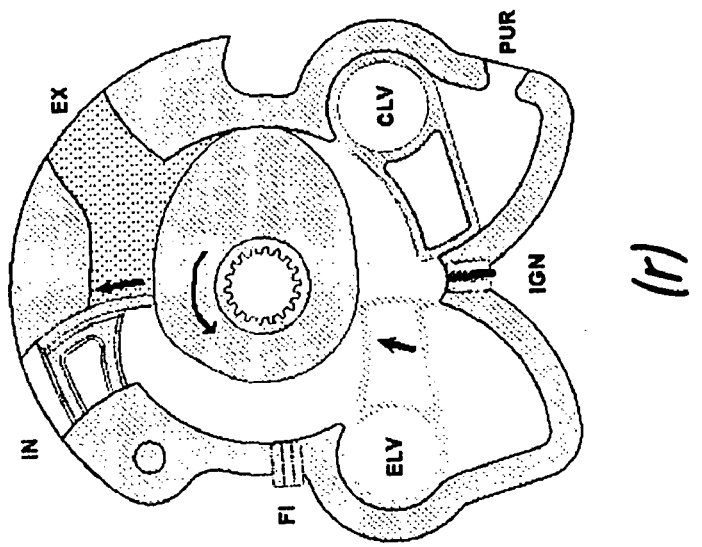
Figure 14:
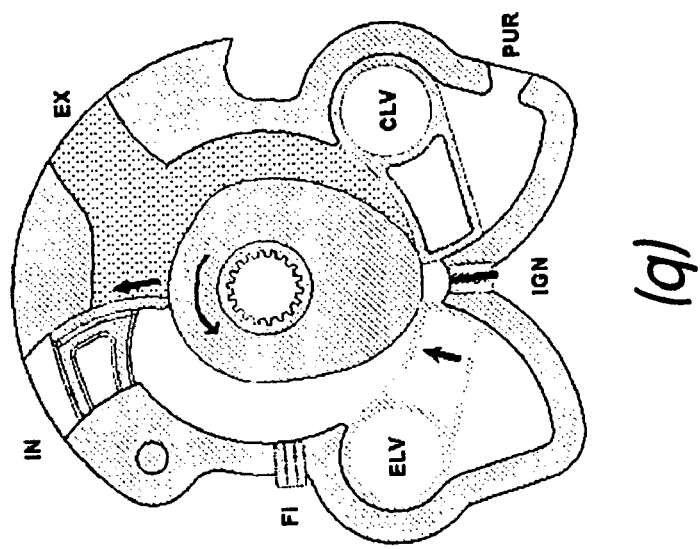
Figure 14:
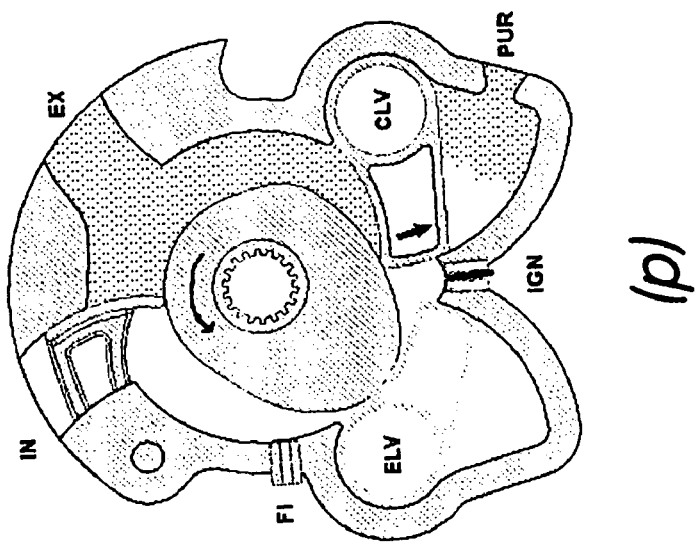
Figure 14:
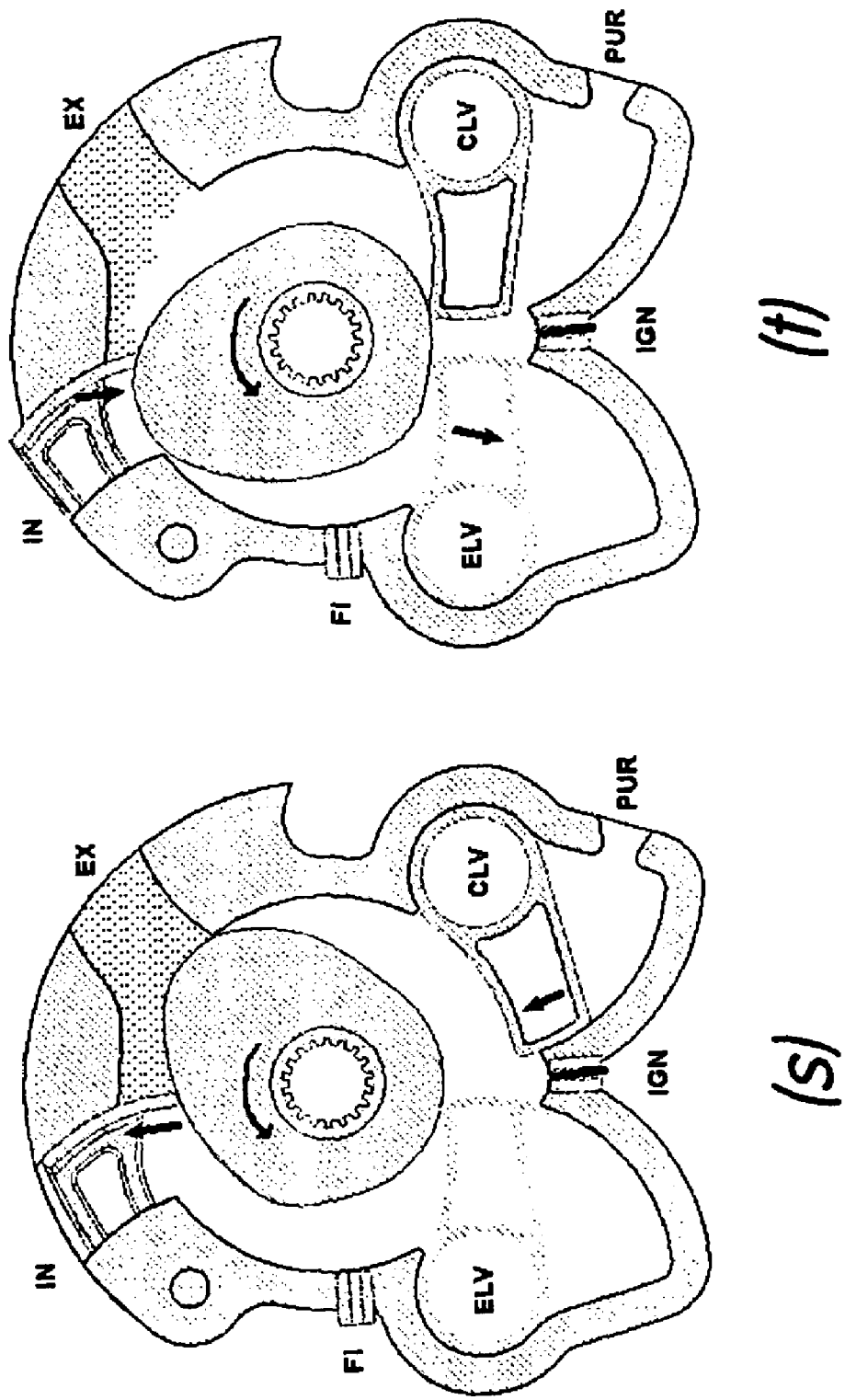

During the first half cycle of the main rotor rotation, FIGS. 14(a) through 14(e), a large volume of air is drawn into the engine, as seen from the large peak on FIG. 13 at "E". Since the main rotor has not sealed off the intake port (IN), however, much of this air is subsequently reexpelled back through the intake port [FIGS. 14(f) and 14(g)]. As the main rotor begins to compress the air charge [14(h)], the clearance valve is momentarily opened, allowing a portion of the air charge, denoted by "U" in FIG. 13, to purge the combustion products of the previous charge [14(i)]. Thus only volume "V" of FIG. 13 is further compressed.

When purging is complete, the compression lobe valve CLV engages the main rotor, forming a seal separating the compressing gasses from the previous cycle's exhaust. As the main rotor approaches top dead center, it forces the compression lobe valve back into its recession [FIG. 14(j)]. At the point of maximum compression [FIG. 14(k)] both lobe valves are engaged, forming seals 424 and 426 with the main rotor and creating a highly pressurized chamber 412 for combustion. As the main rotor continues into the power stroke, the expansion lobe valve maintains the seal separating the expanding combustion products from the fresh air charge to be compressed in the next cycle. As can be seen in FIGS. 14(r) and 14(s), as the clearance rotor revolves to meet the main rotor, it delivers a volume of clean air which becomes mixed with the exhaust gas.

One advantage of this embodiment is that the lobe valves each have a single linear seal with the main rotor, which may be replaced as needed. In addition, the lobe valves bear the force of compression and expansion in a direction perpendicular to their arc of rotation, making meeting structural requirements much easier. The compression to expansion ratio is much more adjustable in this embodiment than in the previous embodiment. By changing the timing of the engagement and disengagement of the lobe valves, a larger or smaller volume of air may be used to purge the compression area, creating greater or lesser expansion asymmetry. In the engine shown in FIG. 14, a 8:1 compression ratio is applied, with an 18:1 expansion. Because the lobe valves may be controlled either by mechanical means, such as cams, or by electromechanical means, these ratios may be matched to specific engine requirements. If electronic timing is used, it may be possible to change the compression ratio of the engine "on the fly" as operating conditions change.

Figure 15:
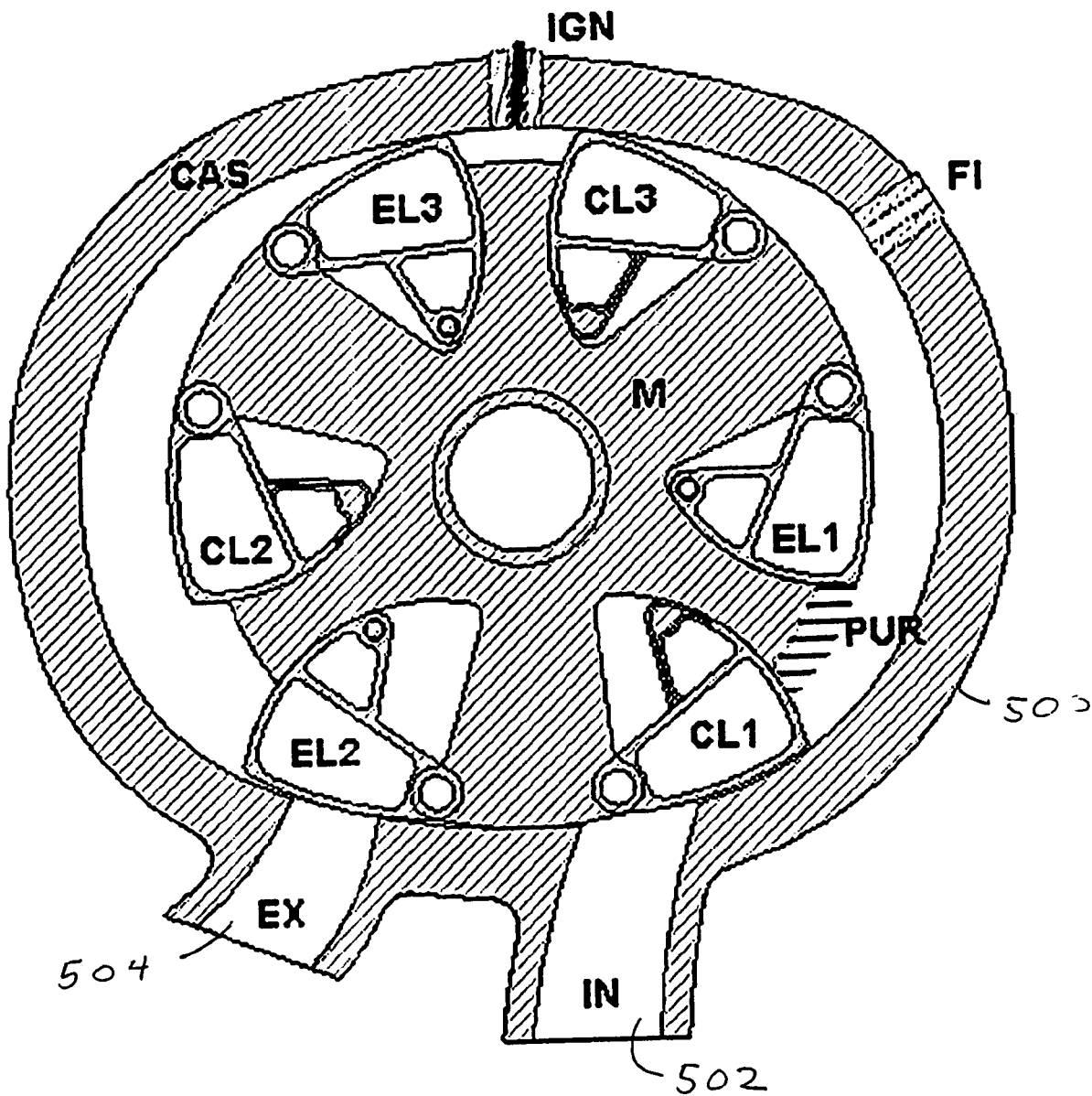
FIG. 15 illustrates a second alternate embodiment of a rotary engine capable of achieving the thermodynamic cycle of the present invention in which rockers are mounted on a rotating main rotor inside of a non-cylindrical housing.
Figure 16:
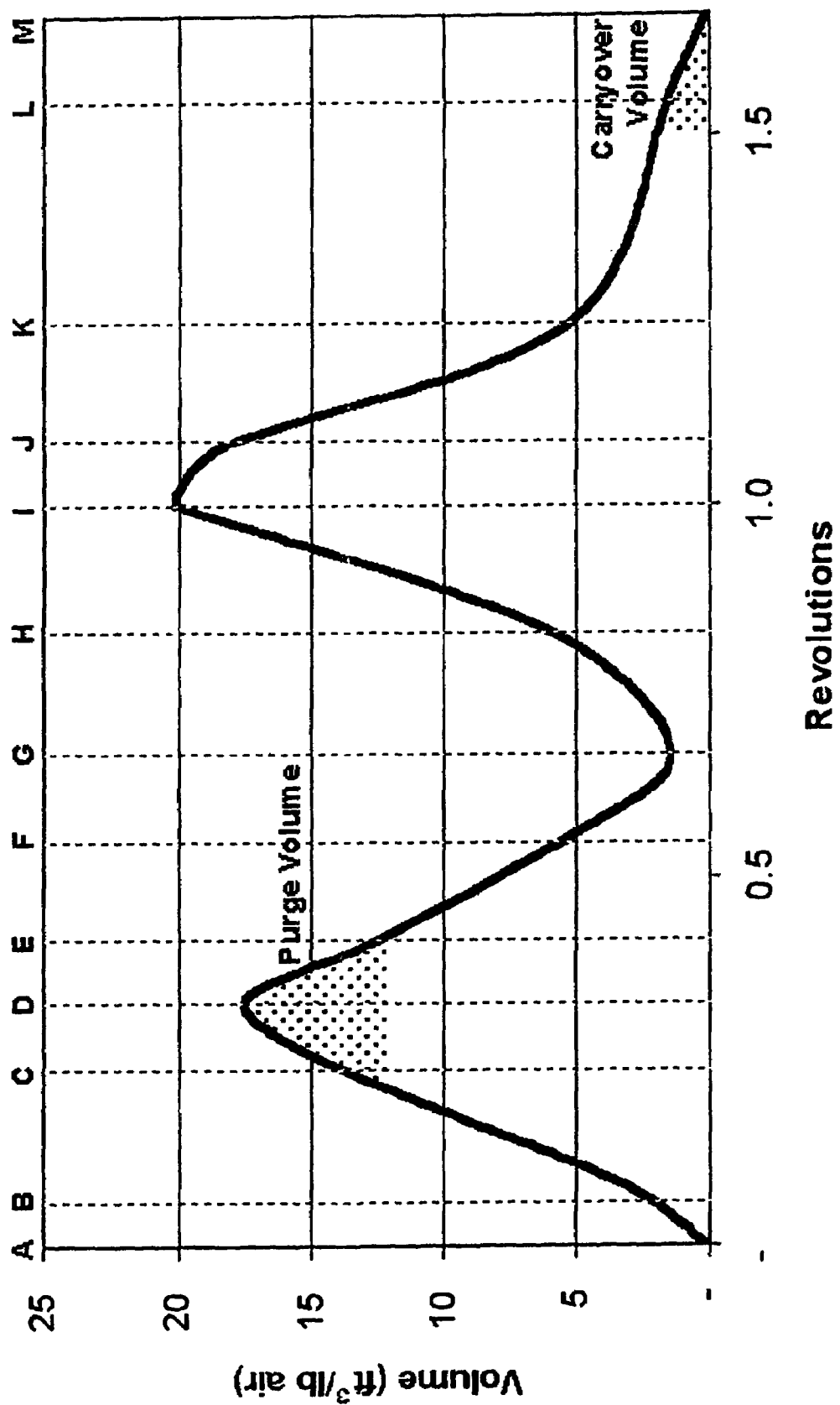
FIG. 16 is a plot of volume versus rotor angle for the second alternate embodiment, showing the volume of a charge of air passing through the engine, from intake to exhaust, with rotor positions "a" through l"m" identified on the plot.

The second alternate embodiment is another device capable of achieving the Peitzke Cycle. This engine, shown in FIG. 15, also separates volumes of gas with compression and expansion rocker arms, but produces three power strokes per revolution instead of the one found in the preferred and first alternate embodiments. The engine consists of a housing 500 having an intake 502 and an exhaust port 504, and a rotor 506 with three sets of opposing rockers CLI and ELI, CL2 and EL2, and CL3 and EL3. As the main rotor rotates, the rockers form seals with the peripheral housing, separating and moving the volumes of gas through the engine as the rockers engage and disengage the housing. The path of the rockers as they rotate may be controlled by cam followers extending from the rockers into cam channels within the top and bottom surfaces of the housing, or by some other method.

Figure 17:
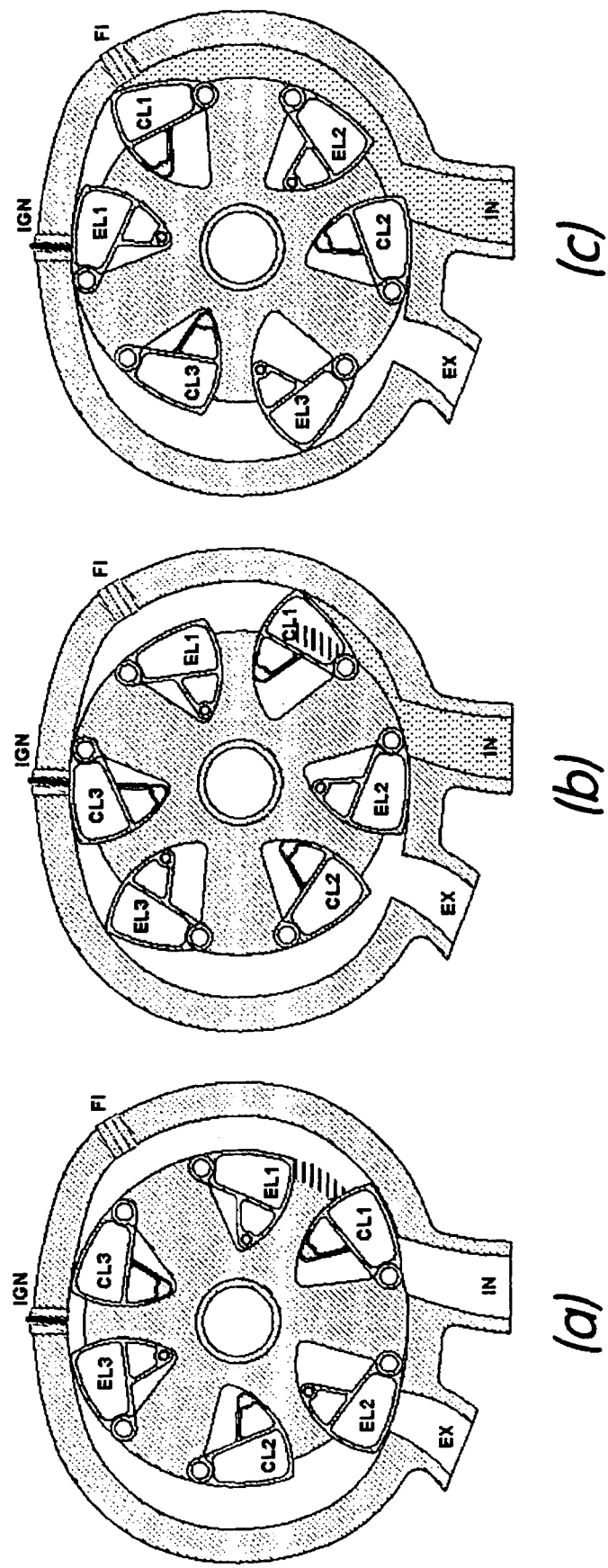
FIGS. 17(a) through (m) follow a volume of air through the second alternate embodiment of the present invention to illustrate the processes undergone by the volume.
Figure 17:
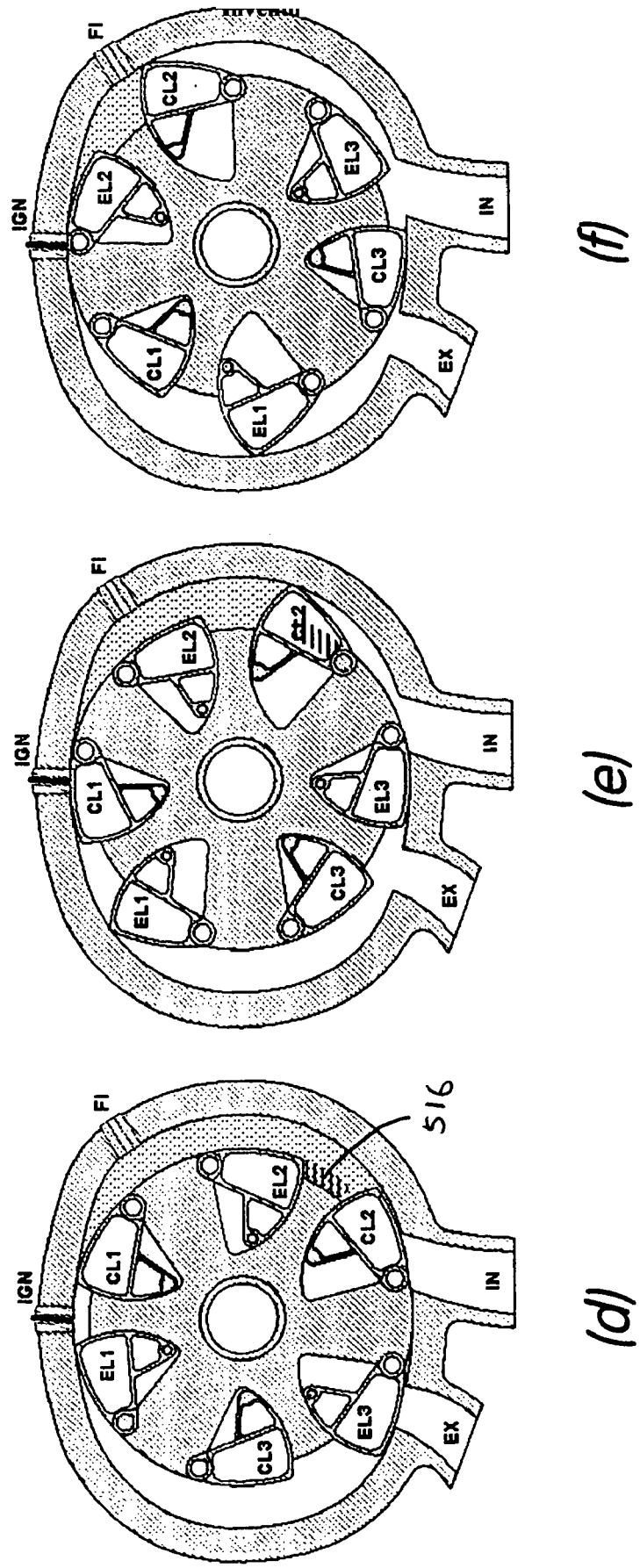
Figure 17:
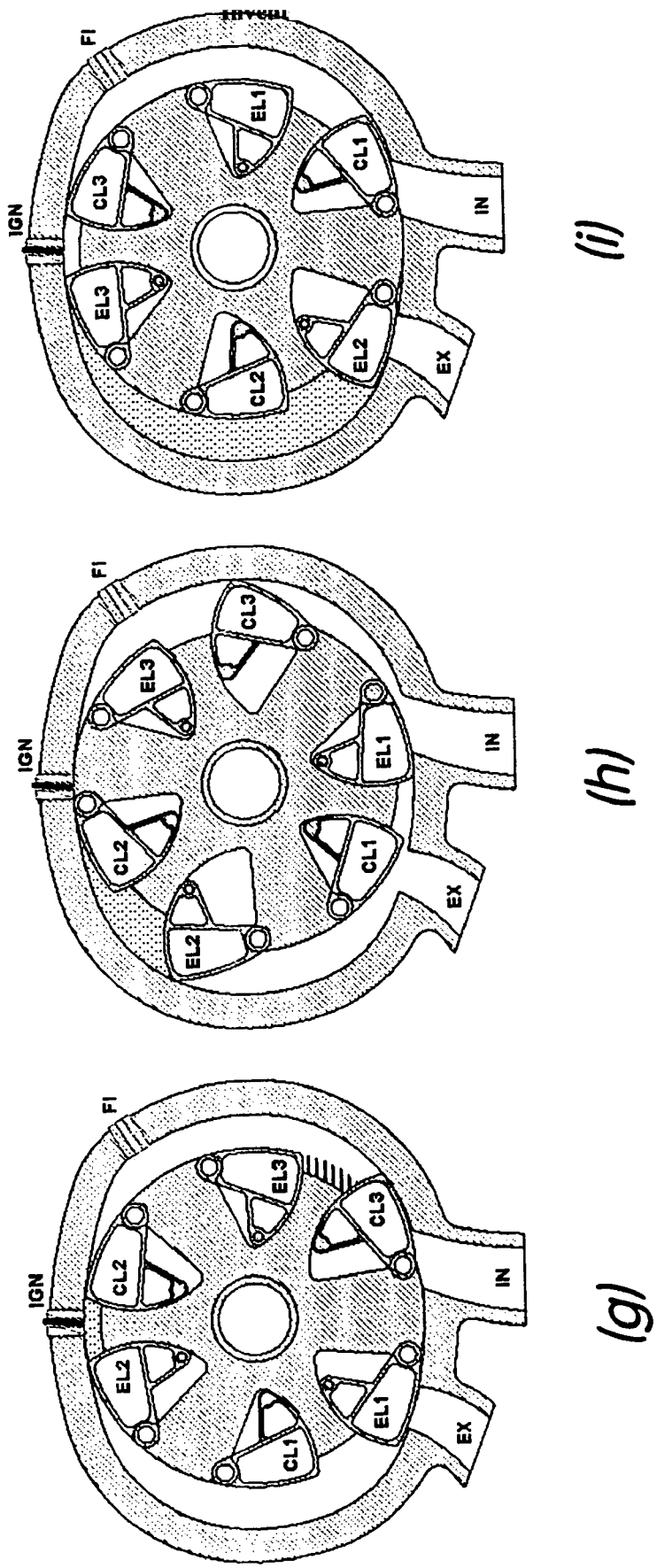
Figure 17:
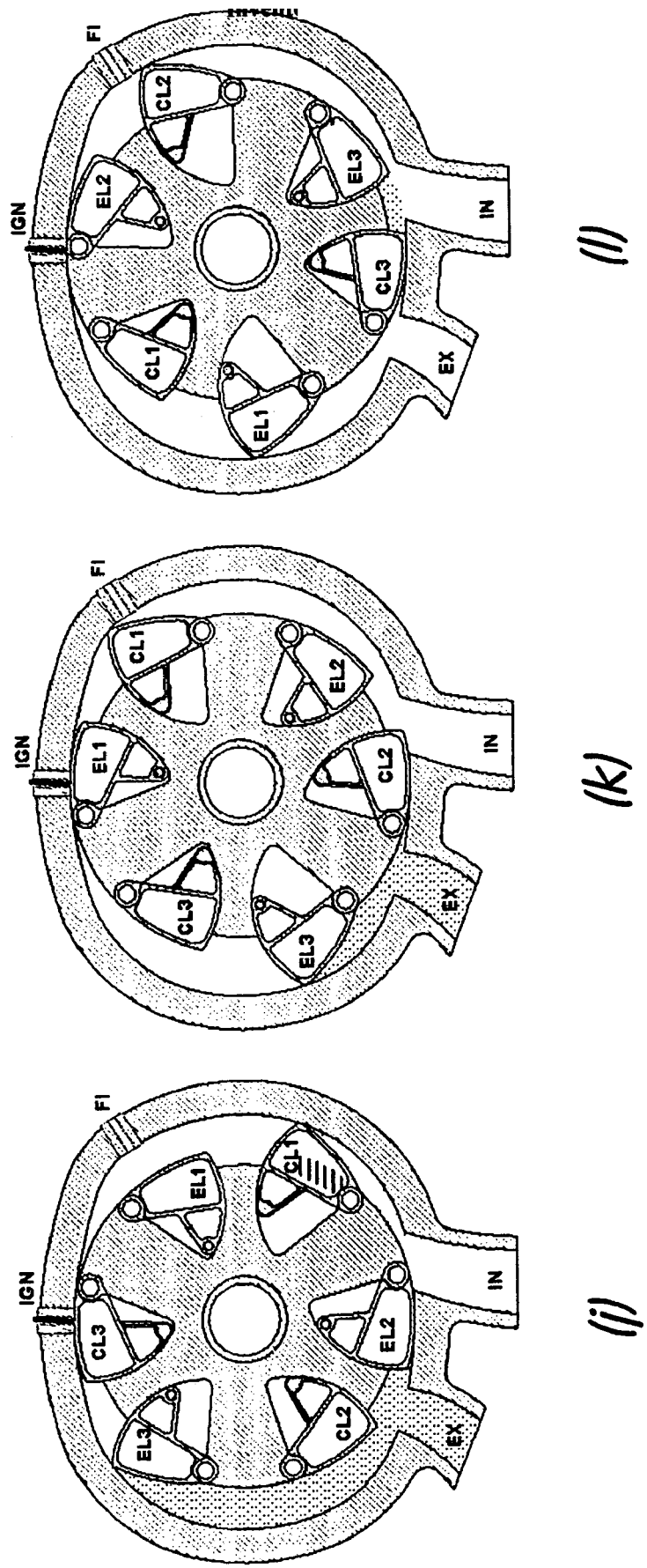
Figure 17:
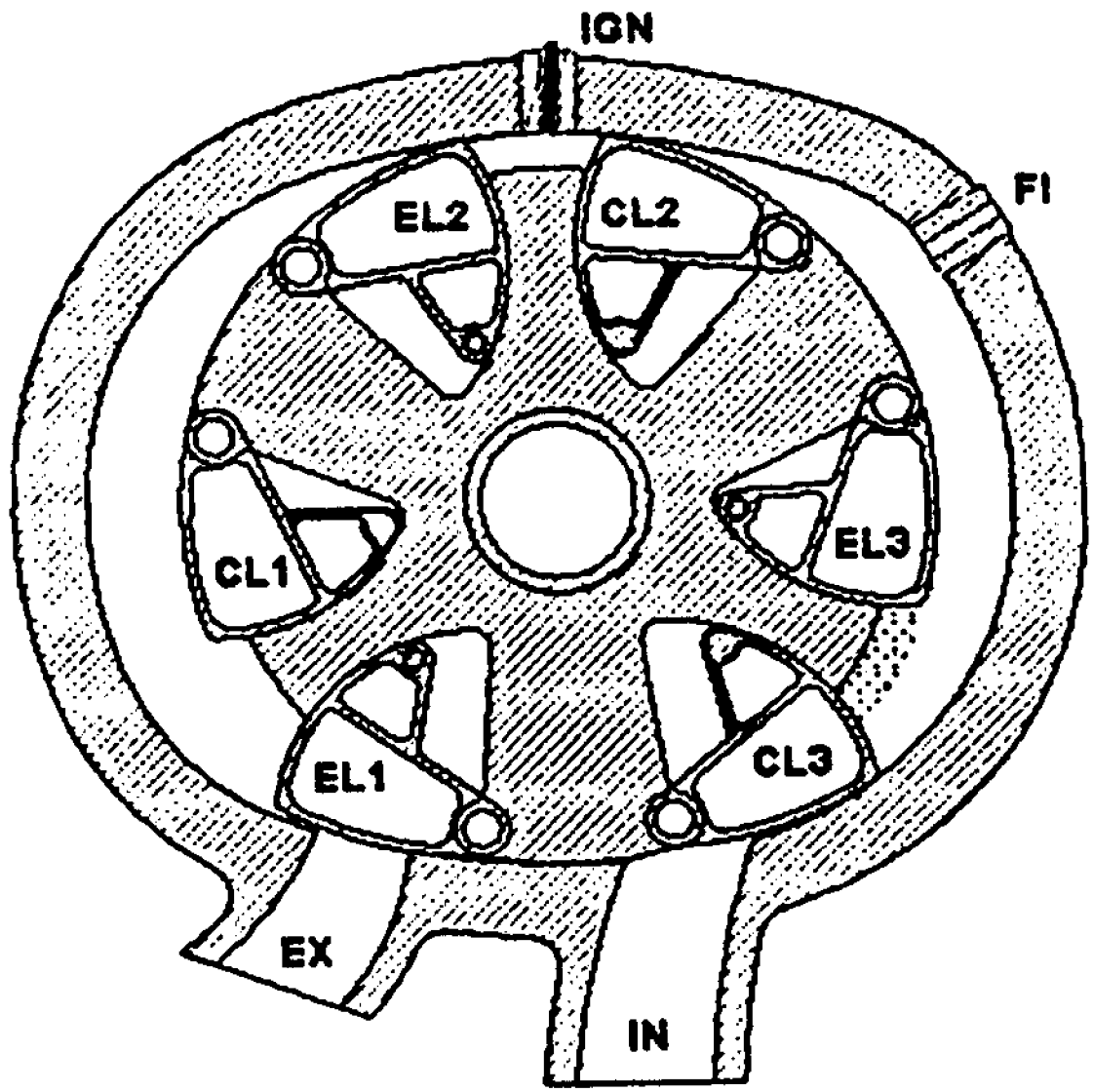

In the first phase of rotation, air is drawn into the engine behind the previous compression rocker CL1 (FIGS. 17(b) and (c)]. As the engine continues to turn, the small amount of carry-over exhaust is purged from the compression side of the engine through a port 516 in the top or bottom of the casing (FIG. 17(d)]. Fuel is added and this gas mixture is compressed by the front of the compression rocker CL2 [FIGS. 17(e) and (f)], until the compression CL2 and expansion EL2 rockers are both engaged with the peripheral housing wall and the gas is at its point of maximum compression [FIG. 17(g)]. Combustion is initiated and the pressure spike generated exerts work on the expansion rocker EL2, causing the main rotor 500 to turn as the gas expands [FIGS. 17(h) and (i)]. As the expansion rocker EL2 passes the exhaust port EX, the gas is vented to atmospheric pressure [FIGS. 17(j) and (k)]. As the next combustion cycle expands behind the following expansion rocker EL1, the residual spent gas from the first cycle is forced from the engine. A small amount of this residual gas is carried into the next air charge in the space between the two rockers and is purged as discussed above prior to compression. This purging, when coupled with the larger width of the expansion area than of the compression area within the housing, results in the asymmetric compression ratios characteristic of the Peitzke Cycle. The relative widths of the compression and expansion sides of the chamber, as well as the volume of air purged at the beginning of compression, allow a wide range of possible expansion to compression ratios.

Besides the advantages discussed above implicit in the Peitzke Cycle, this embodiment also benefits from the very high power to weight ratio created from the three cycles per revolution design. Another advantage is the ability expand the combusted gasses more slowly, holding pressure through a larger fraction of the rotation and creating a more uniform torque load.

The above embodiments are able to achieve higher efficiency than other designs because the geometry and volumetrics are specifically designed to initiate combustion ideal to the point of maximum compression, to eliminate exhaust carry-over, and to have expansion to compression ratios greater than one. Because the engine delivers one power stroke per revolution while performing a four stroke cycle, the power to weight and power to volume ratios of the engine are very high.

A principal advantage of all of the Peitzke Cycle engines is their capability to adopt rotary cycle load adaptive displacement (LAD). This means that the engines are capable of matching their displacement to the required power output while maintaining the relatively higher thermodynamic efficiencies attainable by full throttle operation. The unique geometry of the rotary engine allows for the main rotor to be directly coupled to the drive shaft. In application, these engines would be constructed such that multiple engines rotors would be connected along the same shaft. As a feature of LAD, these individual rotors can be either engaged with the shaft or have their compression disengaged, enabling them to be taken on or off-line step-wise as needed. An example of this would be for a distributed generation system, when power demands are low, most of the rotors could be disengaged. As power demands increase, additional cells could be engaged. When the cells are disengaged, fuel is not injected into the engine. Depending on how rockers are controlled, disengagement may not require a clutch on the main rotor, but rather consist of keeping the rocker arms fully retracted and allowing the rotor to spin freely without any compression or expansion in the engine. One advantage of the Peitzke rotary expansion cycle is that it provides means for effective displacement adaptive hybridization, as opposed to electromechanical hybridization, by virtue of its ability to disengage unnecessary displacement.

Conclusion

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

The corresponding structures, materials, acts, and equivalents of all means or step plus function elements in the claims below are intended to include any structure, material, or acts for performing the functions in combination with other claimed elements as specifically claimed.

What is claimed is:

1. A method of efficiently producing power utilizing a rotary internal combustion engine having a main rotor contained in a housing, comprising the steps of:
   a) drawing a charge of combustion air and fuel into a first chamber through an intake port in the housing wall, the first chamber having periphery formed by the main rotor in a first revolution, the main rotor having opposed portions with a main and lesser radius being axially asymmetric and providing a sweeping seal against the housing at the main radius, a compression rotor cooperating with the main rotor in rotational engagement and having a fixed axis of rotation, a clearance rotor cooperating with the main rotor in rotational engagement and having a fixed axis of rotation and a portion of the housing;
   b) closing the intake port with the main rotor in a second revolution in cooperating rotational engagement with the clearance rotor;
   c) compressing the charge of combustion air and fuel by reducing the volume of the first chamber swept by the main rotor through the second revolution in cooperation with the compression rotor;
   d) igniting the charge of combustion air and fuel in a combustion chamber in the compression rotor;
   e) expanding the ignited charge in a second closed chamber, the second chamber having a periphery formed by the main rotor, the compression rotor cooperating with the main rotor in rotational engagement, the clearance rotor cooperating with the main rotor in rotational engagement;
   f) expelling exhaust through an exhaust port in the housing wall in communication with the second chamber with the main rotor during a third revolution in cooperating rotational engagement with the clearance rotor by reducing the volume of the second chamber through rotation of the main rotor.

2. The method of claim 1, wherein the charge of combusted air and fuel drawn into the first chamber is at an ambient pressure, and the ignited charge is expanded in the second chamber to near that ambient pressure, thereby maximizing thermodynamic efficiency of the engine.

3. The rotary internal combustion engine of claim 1, wherein the main rotor, the combustion rotor, and the clearance rotor operate in uniform circular motion.

4. The method of efficiently producing power utilizing a rotary internal combustion engine having a main rotor of claim 1, further comprising the step of using a portion of the compressed air charge to purge spent fuel and air from the preceding cycle.

5. A rotary internal combustion engine comprising:
   a housing;
   an oblong main rotor carried within the housing rotating about an axis and having a first portion with a lesser radius from the axis and a second portion with an axially asymmetric main radius from the axis providing a sweeping seal against the housing;
   a compression rotor having a radius equal to said lesser radius and cooperating with the first portion of the main rotor in rotational engagement to form a compression chamber with a first portion of the housing and an expansion chamber with a second portion of the housing and further having a relieved portion rotationally engaging the second portion of the main rotor and including a combustion chamber;

a clearance rotor having a radius equal to said lesser radius and cooperating with the first portion of the main rotor and further having a relieved portion cooperating with the second portion of the main rotor in rotational engagement to separate an intake port and an exhaust port in the housing.

6. A rotary internal combustion engine comprising:

a housing;

a main rotor carried within the housing having an axially asymmetric lobe for sealing engagement of the housing;

a compression rotor having a fixed axis of rotation and cooperating with the main rotor in rotational engagement with uniform circular motion to form a compression chamber with a first portion of the housing and an expansion chamber with a second portion of the housing, the compression rotor having an arcuate relief to receive the lobe of the main rotor and form a combustion chamber; and a clearance rotor having a fixed axis of rotation cooperating with the main rotor in rotational engagement with uniform circular motion to separate an intake port and an exhaust port in the housing, the clearance rotor having an arcuate relief to receive the lobe of the main rotor.

\* \* \* \* \*